(12) United States Patent
Watanabe et al.

(10) Patent No.: US 7,133,987 B2
(45) Date of Patent: Nov. 7, 2006

(54) STORAGE SYSTEM AND SNAPSHOT MANAGEMENT METHOD THEREOF

(75) Inventors: Haruaki Watanabe, Isehara (JP); Shigeo Homma, Odawara (JP); Takao Sato, Odawara (JP); Kouji Umemoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 10/770,008

(22) Filed: Feb. 3, 2004

(65) Prior Publication Data

US 2004/0181642 A1 Sep. 16, 2004

(30) Foreign Application Priority Data

Mar. 12, 2003 (JP) ............................. 2003-066500

(51) Int. Cl.
*G06F 12/16* (2006.01)
(52) U.S. Cl. ....................... 711/162; 707/204; 358/404
(58) Field of Classification Search ................ 711/162; 707/204; 358/404
See application file for complete search history.

(56) References Cited

U.S. PATENT DOCUMENTS

| 5,664,186 | A | * | 9/1997 | Bennett et al. ............. 707/204 |
| 6,038,639 | A | | 3/2000 | O'Brien et al. |
| 6,311,193 | B1 | | 10/2001 | Sekido |
| 6,427,184 | B1 | * | 7/2002 | Kaneko et al. ................ 711/4 |
| 6,434,681 | B1 | * | 8/2002 | Armangau .................. 711/162 |
| 6,715,048 | B1 | * | 3/2004 | Kamvysselis ............... 711/162 |
| 6,748,504 | B1 | * | 6/2004 | Sawdon et al. ............. 711/162 |
| 6,820,099 | B1 | * | 11/2004 | Huber et al. ................ 707/204 |
| 6,912,630 | B1 | * | 6/2005 | Pillai et al. .................. 711/162 |
| 2002/0093691 | A1 | * | 7/2002 | Durrant et al. ............. 358/404 |
| 2003/0140070 | A1 | * | 7/2003 | Kaczmarski et al. ........ 707/204 |
| 2003/0167380 | A1 | | 9/2003 | Green et al. |
| 2003/0182301 | A1 | | 9/2003 | Patterson et al. |
| 2003/0212752 | A1 | * | 11/2003 | Thunquest et al. ......... 709/213 |
| 2003/0229651 | A1 | | 12/2003 | Mizuno et al. |
| 2004/0030951 | A1 | * | 2/2004 | Armangau ...................... 714/6 |
| 2004/0167972 | A1 | | 8/2004 | Demmon |
| 2004/0168034 | A1 | * | 8/2004 | Homma et al. ............. 711/162 |
| 2004/0186900 | A1 | | 9/2004 | Nakano et al. |

FOREIGN PATENT DOCUMENTS

| JP | 2001-306407 | 11/2001 |
| JP | 2001-3313778 | 11/2001 |
| JP | 2003-280964 | 10/2003 |

* cited by examiner

*Primary Examiner*—Pierre Bataille
*Assistant Examiner*—Sheng-Jen Tsai
(74) *Attorney, Agent, or Firm*—Mattingly, Stanger, Malur & Brundidge, P.C.

(57) ABSTRACT

In a novel snapshot management method for a data storage system which does not use duplication (mirroring), when a snapshot of a main volume pertaining to a designated time is being taken, every time a write request to a storage region in the main volume is received, if the data in that storage region has not been copied to an auxiliary volume since the designated time, that data is copied to the auxiliary volume, and the writing to the storage region is carried out after that. In the case of sequential writing, also for data in a further storage region, following the target storage region, on which it is predicted that sequential writing will be carried out henceforth, if copying to the auxiliary volume has not been carried out since the designated time, the data is copied to the auxiliary volume in the same way.

24 Claims, 15 Drawing Sheets

STORAGE SYSTEM AND SNAPSHOT MANAGEMENT METHOD THEREOF

CROSS REFERENCES TO RELATED APPLICATIONS

This application relates to and claims priority from Japanese Patent Application No. 2003 066500, filed on Mar. 12, 2003, the entire disclosure of which is incorporated herein by reference.

BACKGROUND OF THE INVENTION

This invention relates to snapshot management, such as snapshot acquisition and restoration of data, in a storage system used in a computer system.

A typical example of a storage system of this kind is, for example, a disk system using RAID (Redundant Arrays of Inexpensive Disk) technology. In a storage system of this kind, for example, as a precautionary measure in case of trouble, and to transfer a stored content to other applications, and in connection with debugging, the recording of a snapshot (stored data content at a specific time) of a certain storage region is carried out.

A typical related method of creating a snapshot is a method which uses duplication (mirroring), as set forth in the below-listed Patent Documents 1 and 2. In this method, during normal operation, in which online operations are carried out continually, all updated data is written in duplicate to two volumes. At a designated time, one of the volumes is cut of f from online operations, and the content of this cut off volume is taken as a snapshot of the other volume at the designated time.

Patent Document 1: JP A 2001 306407
Patent Document 2: JP A 2001 331373

With previously proposed snapshot creation methods based on duplication, there has been the problem that, because of the processing burden of constantly duplicating updated data, the response of the storage system to a higher devices falls, and, as a result, the throughput of the computer system as a whole falls.

SUMMARY OF THE INVENTION

Accordingly, it is an object of the present invention to provide a novel snapshot management method which does not use duplication.

it is another object of the present invention to provide a novel snapshot management method with which it is possible to improve the response of a storage system.

To achieve the above-mentioned objects and other objects, a storage system according to one aspect of the invention, having a first volume and a second volume, includes, for use when it has received a snapshot acquisition request requesting the taking of a snapshot of the first volume pertaining to a designated time: synchronous copying means for, after the designated time, receiving a data access request with a storage region in the first volume as a target, and, if data recorded in the target storage region in the first volume has not been copied to the second volume since the designated time, copying data recorded in the target storage region to the second volume; and advance copying means for, after the designated time, predicting a storage region in the first volume to be the target of a data access request in the future, and, if data recorded in the predicted storage region has not been copied to the second volume since the designated time, copying data recorded in the predicted storage region to the second volume.

A storage system according to another aspect of the invention, having a first volume and a second volume, includes, for use when it has received a snapshot acquisition request requesting the taking of a snapshot of the first volume pertaining to a designated time: synchronous copying means for, after the designated time, receiving a data access request with a storage region in the second volume as a target, and, if data recorded in a storage region in the first volume corresponding with the target storage region in the second volume has not been copied to the target storage region since the designated time, copying data recorded in the storage region in the first volume corresponding with the target storage region in the second volume to the target storage region; and advance copying means for, after the designated time, predicting a storage region in the second volume to be the target of a data access request in the future, and, if data recorded in a storage region in the first volume corresponding with the predicted storage region has not been copied to the predicted storage region since the designated time, copying data recorded in the storage region in the first volume corresponding with the predicted storage region in the second volume to the predicted storage region.

In a preferred embodiment, a storage system according to the invention can further include, for use when, after the designated time, it has received a restore request requesting the restoring to the first volume of the snapshot of the first volume pertaining to the designated time: second synchronous copying means for, after the restore request is received, receiving a data access request with a storage region in the first volume as a target, and, if it is regarded that data recorded in a storage region in the second volume corresponding with the target storage region in the first volume has not been copied to the target storage region since the designated time, copying data recorded in the storage region of the second volume corresponding with the target storage region to the target storage region; and second advance copying means for, after the restore request is received, predicting a storage region in the first volume to be the target of a data access request in the future, and, if it is regarded that data recorded in a storage region in the second volume corresponding with the predicted storage region has not been copied to the predicted storage region since the designated time, copying data recorded in the storage region in the second volume corresponding with the predicted storage region to the predicted storage region.

In another preferred embodiment, a storage system according to the invention can further include, for use when, after the designated time, it has received a restore request requesting the restoring to the first volume of the snapshot of the first volume pertaining to the designated time: second synchronous copying means for, after the restore request is received, receiving a data access request with a storage region in the second volume as a target, and, if it is regarded that data recorded in the target storage region in the second volume has not been copied to the first volume since the designated time, copying data recorded in the target storage region to the first volume; and second advance copying means for, after the restore request is received, predicting a storage region in the second volume to be the target of a data access request in the future, and, if it is regarded that data recorded in the predicted storage region has not been copied to the first volume since the designated time, copying data recorded in the predicted storage region to the first volume.

In another preferred embodiment, a storage system according to the invention can further include second advance copying means for, when after the designated time an advance copying request for snapshot acquisition is received, performing the same copying operation as the advance copying means for the whole range or a specified range of the first volume.

In a further preferred embodiment, a storage system according to the invention can further include third advance copying means for, when after the restore request is received an advance copying request for snapshot restoration is received; performing the same copying operation as the second advance copying means for the whole range or a specified range of the second volume.

And in yet a further preferred embodiment, a storage system according to the invention can further include, for use when, after the designated time, the snapshot of the first volume at the designated time is to be read out: reading means for selectively reading, of data recorded in a storage region of the first volume, data which has not been copied to the second volume since the designated time; and reading means for selectively reading, of data recorded in a storage region of the second volume, data which has been copied there from the first volume since the designated time.

A storage system according to another aspect of the invention, having a storage domain on which are performed writing and reading of data in response to commands from a computer, includes: a storage control part for controlling the writing and reading of data in response to commands from a computer; a first storage region, defined in the storage domain; and a second storage region, defined in the storage domain and associated with the first storage region, for virtually holding a data image of the first storage region pertaining to a certain time, wherein the storage control part has first copying means for, when after said certain time it has received a command to write data to a target region in the first storage region, copying data in the target region to the second storage region before this write command is executed, and the storage control part, when it has received a read request pertaining to the second storage region, if the region for which this read request is received is a region to which copying of data has been carried out by the first copying means, reads out and outputs the data copied by the first copying means, and if the region for which this read request is received is a region to which copying of data has not been carried out by the first copying means, reads out data from the first storage region corresponding to this region.

And, in a preferred embodiment of this storage system, the storage control part can include: determining means for determining whether or not writing from the computer to a target region in the first storage region is sequential, writing; and second copying means for, when the determination of the determining means is that it is sequential writing, copying data of a region continuing from the target region to the second storage region in advance of a write request from the computer arising.

Other and more specific objects and characteristics of the invention will be discussed in the following description of preferred embodiments thereof.

BRIEF DESCRIPTION OF THE DRAWINGS

For a more complete understanding of the invention and Its merits, reference should be made to the accompanying drawings together with the following description.

DETAILED DESCRIPTION OF THE PREFERRED EMBODIMENTS

Figure 1:
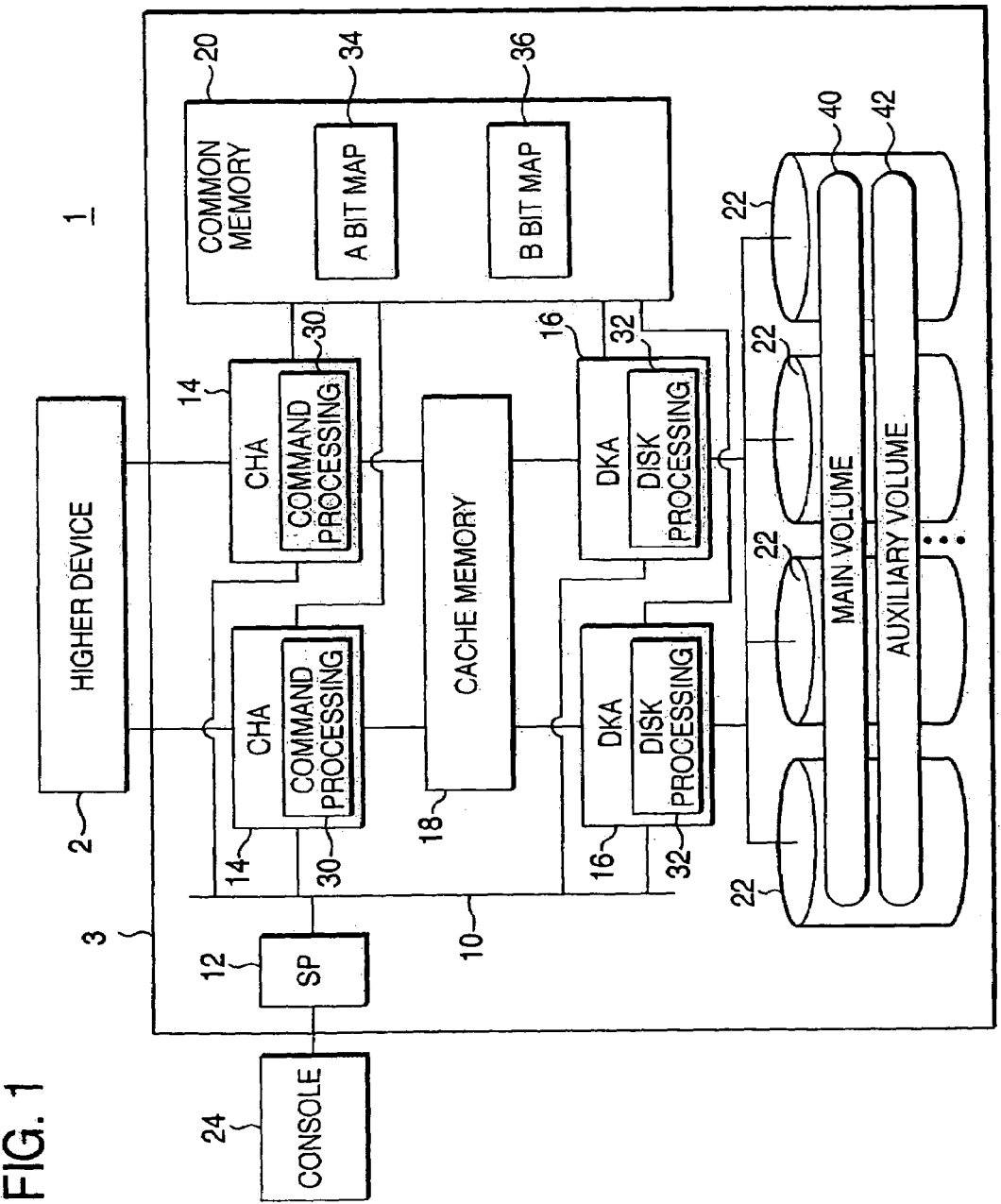
FIG. 1 is a block diagram showing the overall construction of a storage system according to a preferred embodiment of the invention.

FIG. 1 shows the overall construction of a storage system according to a preferred embodiment of the invention.

As shown in FIG. 1, in a computer system 1, a storage system 3 according to the principles of the present invention is communicably connected to a higher device 2, which is called a host computer or a client computer or the like. The storage system 3 is a disk system to which RAID technology has been applied, and, for example, it has multiple disk devices 22 and records data on them.

To control the disk devices 22, this disk system 3 has multiple processors, such as a service processor (hereinafter, SP) 12, one or more channel adaptors (hereinafter, CHA) 14, and one or more disk adaptors (hereinafter, DKA) 16, and these processors 12, 14, 16 can communicate with each other via an internal LAN 10. Also connected to these CHAs 14 and DKAs 16 are a cache memory 18 which is used in the exchanging of data among those processors and a common memory 20, which is used in the exchange of commands, responses and control information among the processors and in applications, such as work regions. Also, a console 24 constituting a man machine interface of the disk system 3 is connected to the SP 12.

In this disk system 3, the CHAs 14 mainly perform operations, such as processing of commands from the higher device 2 and data exchange with the higher device 2, in accordance with a pre loaded program 30 for command processing. And, the DKAs 16 mainly perform operations, such as writing and reading of data to and from volumes in the disk devices 22 and data exchange among the volumes, in accordance with a pre loaded program 32 for disc processing. The exchange of data among the CHAs 14 and the DKAs 16 and among the volumes is carried out via the cache memory 18.

In this disk system 3, in accordance with RAID technology, multiple or many logical volumes 40, 42 are built on the recording regions of the disk devices 22. In this specification, for convenience of description, one of these multiple logical volumes 40, 42, i.e. the volume 40, will be called 'the main volume', and the other, i.e. the volume 42, will be called 'the auxiliary volume'. Typically, the main volume 40 is, for example, a volume on which there is recorded original data actually used in the business of the computer system 1. On the other hand, the auxiliary volume 42 is used, in a normal state wherein continual online work is carried out, for recording copies of part or all of the data in the main volume 40, with the object of creating a snapshot of the main volume 40. In that sense, the main volume 40 and the auxiliary volume 42 are associated with each other, and there is a one to one relationship between the storage locations in the main volume 40 and the storage locations in the auxiliary volume 42. Although in the example shown in FIG. 2 there is only one pair consisting of a main volume 40 and an auxiliary volume 42, normally there are multiple or many pairs each consisting of a main volume and an auxiliary volume, with different applications and purposes. However, in the following description, to make the description simple, just a pair consisting of one main volume 40 and one auxiliary volume 42 will be described.

Two bit maps 34, 36 are provided in the common memory 20 in association with the main volume 40 and auxiliary volume 42 pair. In this specification, one of the bit maps will be called A bit map 34 and the other will be called B bit map 36.

A bit map 34 and B bit map 36 are made up of numerous bits allocated to the pairs of corresponding storage locations of the main volume 40 and the auxiliary volume 42, and the values of these bits express the state of all the data recorded in the main volume 40 and the auxiliary volume 42. However, the size of one unit of storage location in the volumes 40, 42 corresponding to one bit of the bit maps 34, 36 is not necessarily the same as the size of one unit of storage location constituting an object of data access in the volumes 40, 42. As will be explained in detail later, the A bit map 34 and the B bit map 36 are referred to and overwritten by the CHAs 14 and/or the DKAs 16 to control operations, such as taking a snapshot of the main volume 40 or restoring part or all of the data of such a snapshot to the main volume 40.

In accordance with user instructions inputted to the console 24, the SP 12 carries out operations, such as environment setting and overall control of this disk system 3, and displays the status of the disk system 3 and other information on a display screen (not shown) of the console 24. Of the operations which the SP 12 can perform on the basis of user instructions inputted to the console 24, those relating to snapshot management include, for example, the setting of various parameters relating to snapshot management, such as the setting of the range of storage regions to be the object of 'advance copying', which will be further discussed later, and the inputting of various requests relating to snapshot management, such as snapshot acquisition requests and snapshot restoration requests. These operations, such as parameter setting and request inputting, can also be carried out from the higher device 2.

Figure 2:
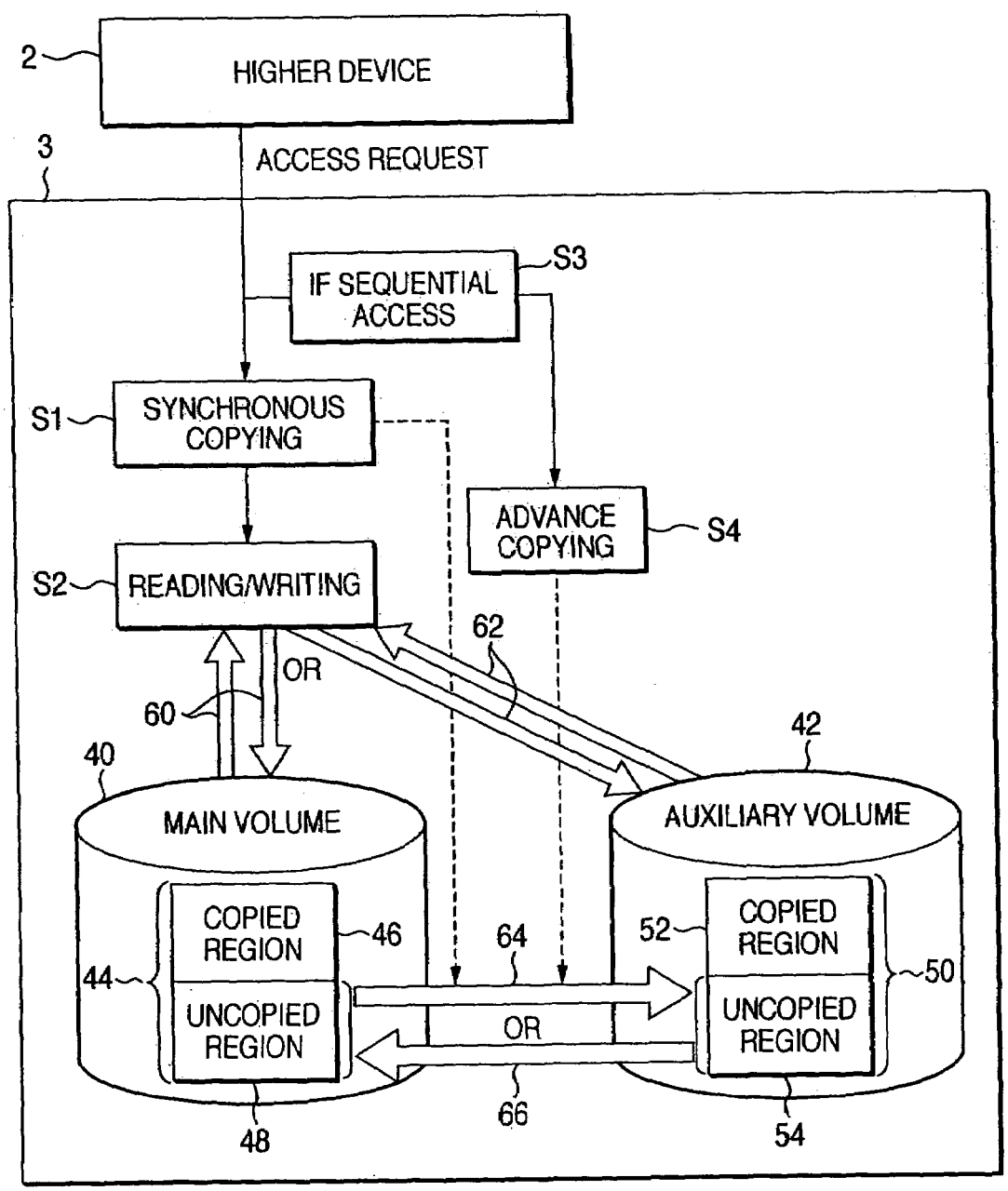
FIG. 2 is a flow chart of basic snapshot management operations carried out by a disk system 3.

FIG. 2 shows the basic operation of snapshot management carried out by the disk system 3. In a normal state wherein online operation of the disk system 3 is being carried out, this basic operation is executed each time a data access request is issued from the higher device 2 to the disk system 3. This basic operation is applied both in the case of taking a snapshot of the main volume and in the case of restoring part or all of a snapshot to the main volume. How this basic operation is actually applied in the specific cases of snapshot acquisition and restoration will be described later for each case; here, this basic operation will be described generally, on the basis of FIG. 2.

As shown in FIG. 2, the higher device 2 submits to the disk system 3 a request for access (reading or writing), with a designated storage region (one or more storage locations) inside a designated volume as a target. The storage region which is the target of the data access request may be in the main volume 40 or may be in the auxiliary volume 42. In either case, in response to the data access request from the higher device 2, the disk system 3 first performs a copying process called 'synchronous copying' on the target storage region (step S1). This synchronous copying (S1) is an operation of copying data in the target storage region of the data access request between the main volume 40 and the auxiliary volume 42, from one to the other, with the purpose of taking or restoring a snapshot. More specifically, in the case of taking a snapshot of the main volume 40, copying from the main volume 40 to the auxiliary volume 42 is carried out, as shown by the arrow 64, and in the case of restoring part or all of the data of such a snapshot, copying from the auxiliary volume 42 to the main volume 40 is carried out, as shown by the arrow 66.

After the synchronous copying (S1) is finished, the disk system 3 performs an accessing process (i.e. reading or writing of data) on the target storage region of the data access request (step S2). And, needless to say, when the target storage region is in the main volume 40, the accessing (S2) is carried out on that storage region in the main volume 40, as shown by the arrow 60, and when the target storage region is in the auxiliary volume 42, the accessing (S2) is carried out on that storage region in the auxiliary volume 42, as shown by the arrow 62. Synchronous copying (S1) and accessing (S2) are carried out irrespective of whether the type of access is random access or sequential access.

Also, when the type of access being carried out is sequential access (including when the disk system 3 has so inferred) (S3), in parallel or serially with the above-mentioned synchronous copying (S1) and accessing (S2) operations, the disk system 3 executes a copying process called 'advance copying' (S4). This advance copying (S4) is an operation of copying data in a storage region range (hereinafter referred to as the sequential access prediction range) which it is predicted will be accessed sequentially henceforth following a target storage region of a data access request, with the purpose of taking or restoring a snapshot. In short, this advance copying (S4) is a copying process, for taking or restoring a snapshot, executed on a storage region which it is known with a substantial probability will be accessed henceforth, in 'advance', before a data access request with that storage region as its target is actually submitted.

Accordingly, if advance copying (S4) is carried out on a certain storage region once, when a data access request with that storage region as its target is submitted in the future, there is no need for synchronous copying (S1) of that region to be carried out again. In this advance copying (S4) also, as in the synchronous copying (S1) discussed above, in the case of taking a snapshot of the main volume 40, copying is carried out from the main volume 40 to the auxiliary volume 42, as shown by the arrow 64, and in the case of restoring part or all of the data of a snapshot, copying is carried out from the auxiliary volume 42 to the main volume 40, as shown by the arrow 66.

Now, if either the above-mentioned synchronous copying (S1) or advance copying (S4) (i.e. copying with the purpose of taking or restoring a snapshot) has been carried out once on any storage region, thereafter that type of copying should not be carried out again on that same storage region. For this reason, in the disk system 3, when synchronous copying (S1) is about to be carried out on any storage region, and when advance copying (S4) is about to be carried out on any storage region, it is checked whether or not this type of copying has already been carried out on that storage region. This check can be carried out using the bit maps 34, 36 shown in FIG. 1 (a specific method will be discussed later). If the result of this check is that this type of copying has been carried out already on that storage region, the disk system 3 cancels (does not execute) the synchronous copying (S1) or advance copying (S4) of that storage region. Accordingly, synchronous copying (S1) and advance copying (S4) are executed only on storage regions of which this type of copying has not yet been carried out, and on storage regions on which this type of copying has been carried out already, they are not executed again.

This will be explained using a simple example. In FIG. 2, it will be supposed that a request for sequential access with a certain storage region in the main volume 40 as the target has been submitted from the higher device 2. And, it will be supposed that the range 44 (hereinafter referred to as the sequential access range) shown in the main volume 40 in the figure is a range made up of the target storage region of that data access request and a sequential access prediction range following that storage region. Also, it will be supposed that, in this sequential access range 44, there is a region on which synchronous copying or advance copying has already been executed (hereinafter called the already copied region) 46 and a region on which that type of copying has not yet been carried out (hereinafter called the uncopied region) 48 (although in the example shown there is only one already copied region 46 and one uncopied region 48, in practice there may be multiple already copied regions and multiple uncopied regions mixed up more complexly).

In this case, of the sequential access region 44, the disk system 3 proposes to carry out synchronous copying (S1) on the target storage region of the data access request and proposes to carry out advance copying (S4) on the sequential access prediction range, but in doing so cancels the synchronous copying (S1) and the advance copying (S4) to the already copied region 46 and actually only executes that type of copying on the uncopied region 48. Accordingly, for example, when all of the target storage region of the data access request is in the already copied region 46, synchronous copying (S1) is not carried out at all, and when all of the sequential access prediction range is in the already copied region 46, advance copying (S4) is not carried out at all.

The above example was directed to a case wherein sequential access to the main volume 40 was requested by the higher device 2, but there is also the case of sequential access to the auxiliary volume 42 being requested. In this case also, synchronous copying (S1) and advance copying (S4) are executed only on an uncopied region 54 of a sequential access range 50 in the auxiliary volume 42, and are not executed on an already copied region 52.

By copying, for snapshot acquisition and restoration being carried out selectively, only on the uncopied region 48 like this, compared to the conventional mirroring method, wherein data is constantly duplicated, the processing burden on the disk system 3 is lightened.

Figure 3:
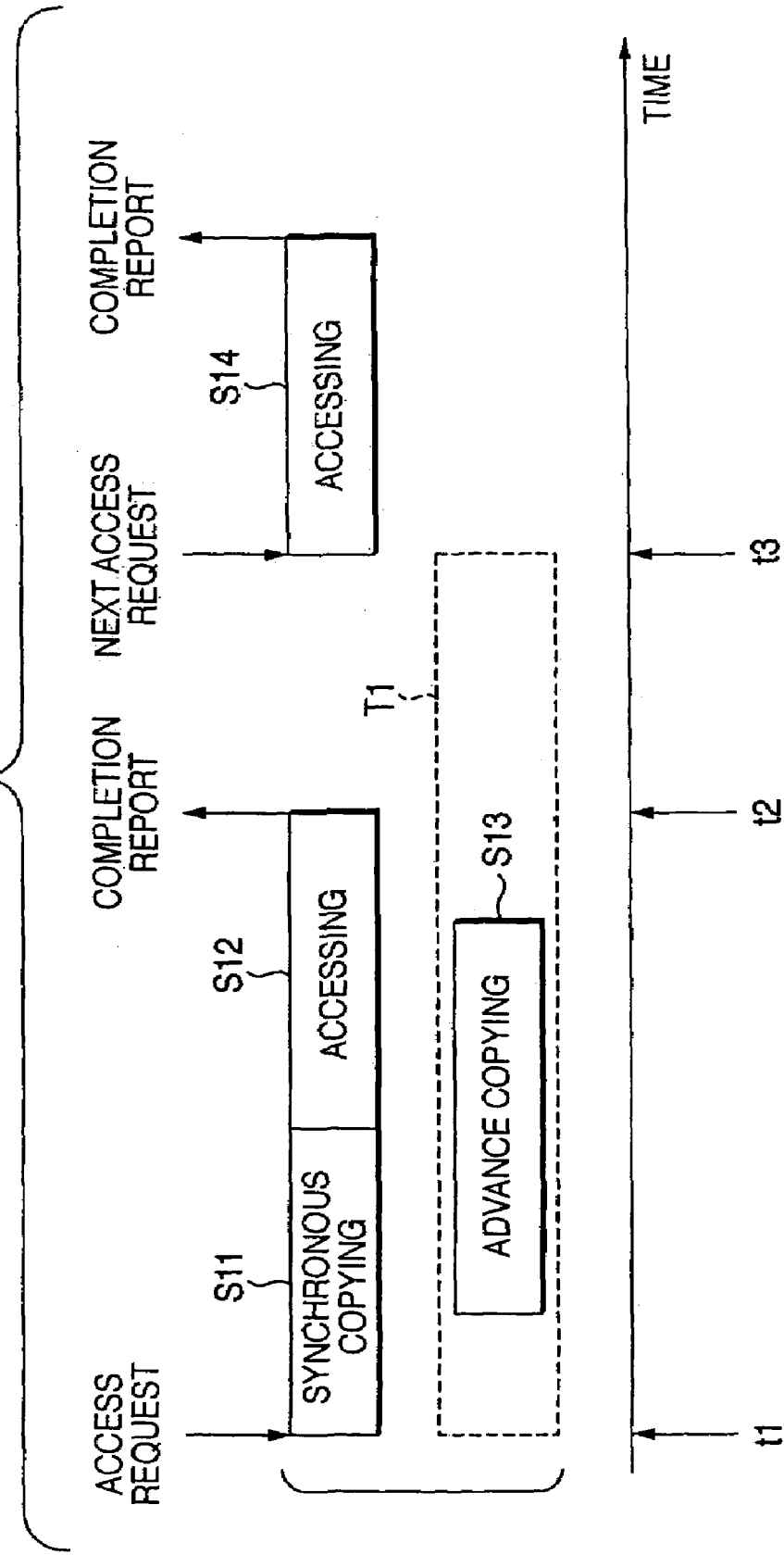
FIG. 3 is a diagram showing an example of the timing with which synchronous copying (S1), accessing (S2) and advance copying (S4) shown in FIG. 2 are executed.

FIG. 3 shows an example of the timing with which the above-mentioned synchronous copying, accessing and advance copying are executed.

As shown in FIG. 3, from a time t1 at which a data access request from the higher device 2 is received, synchronous copying (S11) and accessing (S12) are immediately carried out in succession. At the time t2 at which the accessing (S12) finishes (specifically, in the case of writing, the time at which the CHA 14 finishes writing data received from the higher device 2 to the cache memory 18, or, in the case of reading, the time at which the CHA 14 finishes reading data from the cache memory 18), a completion report is returned to the higher device 2. After that, the next data access request comes from the higher device. Advance copying (S13) is executed when possible in the period T1 between the time t1 at which the first data access request was received and the time t3 at which the next data access request is received. If the target storage region of the data access request and the storage region to be the object of advance copying (S13) (the sequential access prediction range) exist on physically different storage media both accessible at the same time, the advance copying (S13) can be carried out in parallel while the synchronous copying (S11) and the accessing (S12) are being carried out. If the target storage region of the data access request and the sequential access prediction range exist on physically the same storage medium and cannot be accessed at the same time, the advance copying (S13) can be carried out in the interval between the time t2 at which the accessing (S12) finishes and the time t3 at which the next data access request arrives. In either case, as a result of the advance copying (S13) being carried out, when the next data access request comes, because synchronous copying can be skipped and accessing (S14) started immediately, the completion report can be returned to the higher device sooner.

As a result of advance copying being carried out on the target storage region of a future data access request before the data access request comes like this, the response of the disk system 3 to the higher device 2 becomes faster.

Now, the determination in the disk system 3 of whether or not the access type is sequential can be carried out, for example, by any of the following methods. A first method is the method 0 receiving a command indicating sequential access from the higher device 2. For example, in the case of a CKD (Count Key Data) system, whether or not it is sequential access can be determined by referring to a parameter of a Define_Extent command. And, for example, even when an interface is being used which at present does not have means for indicating whether or not the higher device 2 is accessing the disk system 3 sequentially, such an interface (command, signal or the like) can be added.

A second method is the method of predicting, when multiple most recent accessings have been sequential accesses, that sequential access is likely to be carried out henceforth also. For example, in the case of a data access request in SCSI command form, because the target storage region is specified using a head LBA (Logical Block Address) and a transfer data length, if the head LBAs and transfer data lengths of multiple data access requests received consecutively specify consecutive storage regions, it can be predicted that sequential access will be carried out henceforth also. Or, for example, in the case of NAS (Network Attached Storage), because a data access request specifies the target storage region using a file identifier and a transfer data length from the head LBA of that file, if the head LBAs and offsets and transfer data lengths of multiple data access requests received consecutively specify consecutive storage regions, it can be predicted that sequential access will be carried out henceforth also.

The determination of the sequential access prediction range to be the object of advance copying can, for example, be carried out by the following methods. A first method is the method of the user or the higher device 2 presetting the size of this range (or a parameter for deciding a size). For example, by a user through the console 24 shown in FIG. 1, or by the higher device 2, setting a freely determined number of LBAs as the sequential access prediction range, when a data access request has come the range of the set number of LBAs following the target storage region of the data access request can be set as the object of the advance copying. Or, for example, as in the case of NAS, when a target file of the data access request is specified, by the user through the console 24 shown in FIG. 1, or by the higher device 2, setting for example 'whole file' as the size of the sequential access prediction range, when a data access request has come, all of the storage regions in which the target file is held can be made the object of advance copying.

A second method is the method of a user or the higher device 2 specifying to the disk system 3 the sequential access range or the size of that range (or a parameter for deciding the size) on every occasion, such as a volume access request, upon which copying should be carried out. For example, if the higher device 2 specifies a sequential access range using a cylinder number and a head number, LBAs, or a file identifier or the like, the disk system 3 can carry out advance copying on that specified range.

A third method is the method of learning the size of a sequential access range with a high expectability, on the basis Of the sizes of ranges sequentially accessed in the past. For example, an LBA count with a high expectability can be learned like that, and when a data access request has come, the range corresponding to the learned LBA count following the target storage region of the data access request can be set as the object of advance copying.

Now that the basic operation of snapshot management has been described, a more detailed operation will be explained for a number of specific cases.

Figure 4:
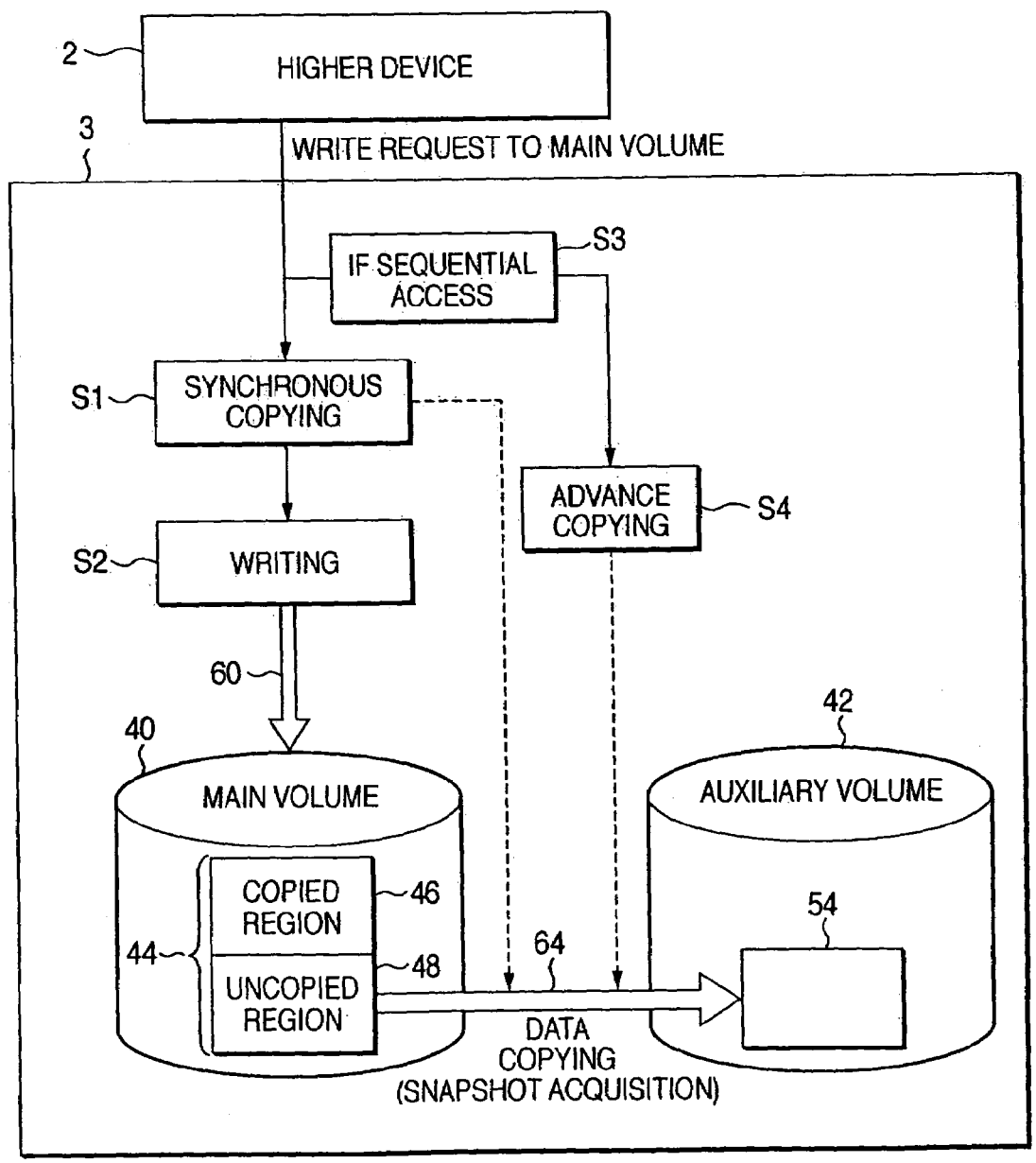
FIG. 4 is a flow chart showing the operation of the disk system 3 in a case of taking a snapshot on writing data to a main volume 40.

First, a typical example of a case of taking a snapshot of the main volume 40 will be described. FIG. 4 shows the operation flow of the disk system 3 in this case.

The higher device 2 can submit to the disk system 3 a request for a snapshot of the main volume 40 (hereinafter, snapshot acquisition request) at a designated point in time to be taken. A user can also submit an acquisition request for a snapshot at a designated time to the disk system 3, by operating the console 24. The disk system 3, in response to the received snapshot acquisition request, from the designated time (which may be a specific time in the future specified by the snapshot acquisition request or it may be the time at which the snapshot acquisition request is received, and the time hereinafter will be called the designated snapshot time) onward, executes the operation shown in FIG. 4 every time it receives from the higher device 2 a request for data writing (hereinafter, write request) to the main volume 40.

As shown in FIG. 4, the disk system 3, in response to a received write request pertaining to the main volume 40, first performs synchronous copying (S1) of the target storage region of the write request in the main volume 40. However, this synchronous copying (S1) is executed only if copying of that target storage region for snapshot acquisition has not already been executed between the above-mentioned designated snapshot time and the present time. In this synchronous copying (S1), data presently recorded in the target storage region in the main volume 40 (that is, the data recorded there at the above-mentioned designated snapshot time) is copied to the corresponding storage region of the auxiliary volume 42, as shown by the arrow 64.

After this synchronous copying (S1), the disk system 3 writes new data received from the higher device 2 to that target storage region (S2).

Also, when it has been determined that this access is sequential access (S3), the disk system 3 performs advance copying of a sequential access prediction range of the main volume 40 (S4). However, this advance copying (S4) is executed only for storage regions, in the sequential access prediction range, of which copying for snapshot acquisition has not already been carried out between the above-mentioned designated snapshot time and the present time. In this advance copying (S4), data presently recorded in the object storage regions in the main volume 40 (that is, the data recorded there at the designated snapshot time) is copied to the corresponding storage regions of the auxiliary volume 42, as shown by the arrow 64.

Ultimately, if the range made up of the target storage region and the sequential access prediction range following this in the main volume 40 is the range 44 shown in the figure, only the data recorded in the uncopied region 48 in this range 44 is copied to the corresponding uncopied region 54 in the auxiliary volume 42 by the synchronous copying (S1) and the advance copying (S4).

Thereafter, the series of operations described above (S1 to S4) are executed again each time a subsequent write request arrives.

Figure 5:
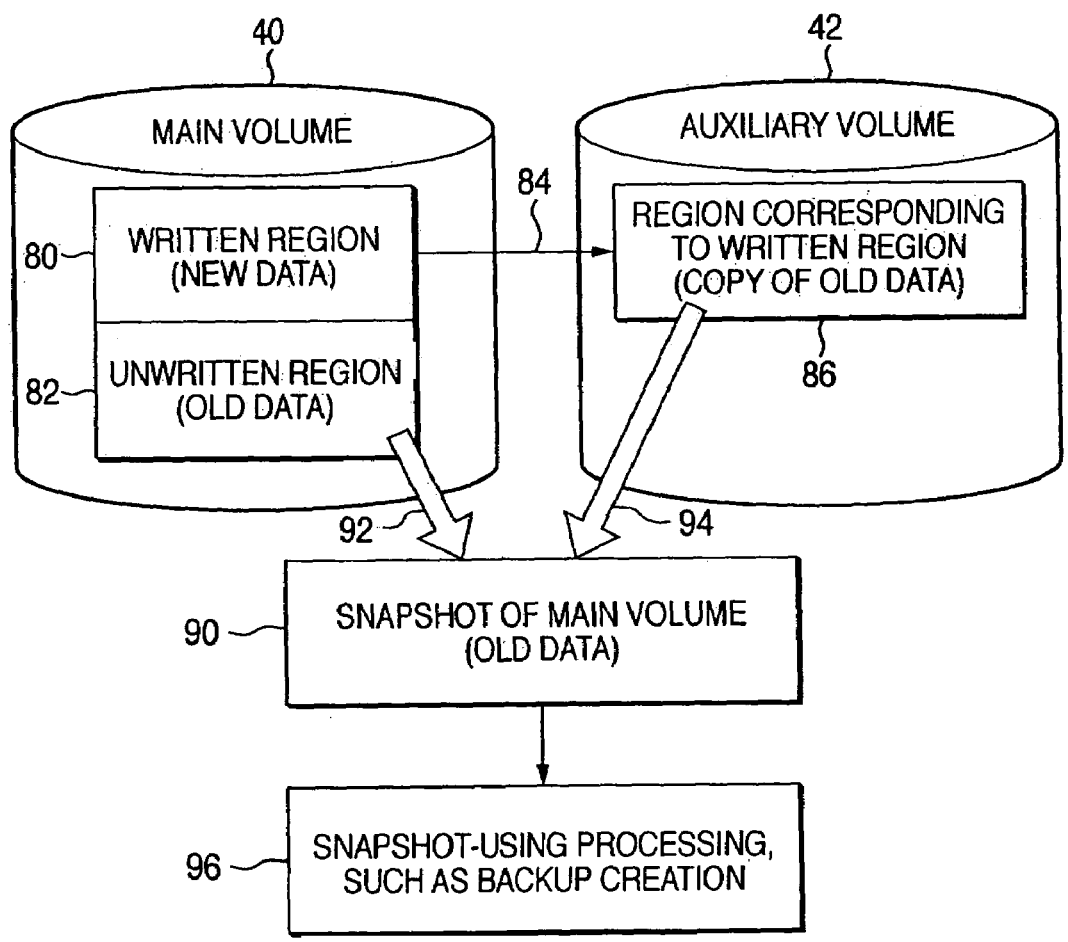
FIG. 5 is a block diagram showing the constitution of a snapshot taken by the operation shown in FIG. 4.

FIG. 5 shows the composition of a snapshot acquired as a result of the operation shown in FIG. 4.

As shown in FIG. 5, of all the storage regions 80 and 82 in the main volume 40, in the case of the storage regions 80 to which new data has been written since the designated snapshot time (hereinafter called already written regions), their old data from the designated snapshot time is removed to and held in the corresponding storage regions 86 of the auxiliary volume 42 by the synchronous and advance copying (arrow 84) described above. In the storage regions 82 (hereinafter called unwritten regions) in the main volume 40 to which new data has not yet been written, the old data from the designated snapshot time is still held as before. Accordingly, the data recorded in the above-mentioned corresponding storage regions 86 of the auxiliary volume 42 and the data stored in the unwritten regions 82 of the main volume 40 together constitute the snapshot 90 of the main volume 40 at the designated snapshot time. Thus, the snapshot 90 is divided between the main volume 40 and the auxiliary volume 42.

When the need has arisen to use this snapshot 90 (for example when a backup copy is to be made), data is read from the above-mentioned corresponding storage regions 86 of the auxiliary volume 42 and the unwritten regions 82 of the main volume 40 (arrows 92, 94) and sent to the snapshot using process 96.

Figure 6:
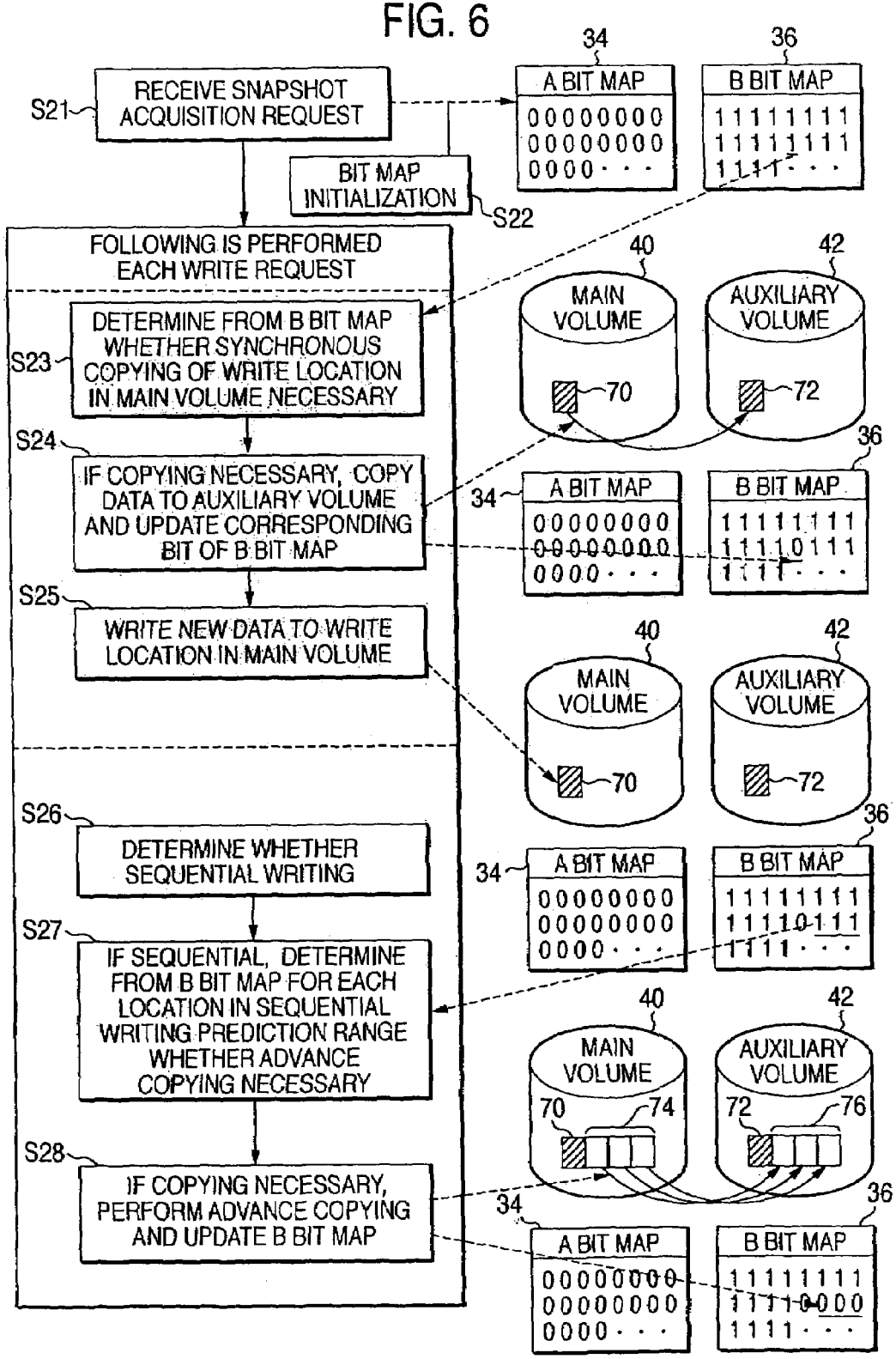
FIG. 6 is a flow chart showing more specifically how bit maps 34, 36 are used in the operation shown schematically in FIG. 4.

FIG. 6 shows specifically how the bit maps 34, 36 are used in the operation shown schematically in FIG. 4.

As shown in FIG. 6, when it receives a snapshot acquisition request (S21), the disk system 3 performs a bit map initialization (S22) at the designated snapshot time. In this bit map initialization (S22), it sets all the bits of the A bit map 34 to '0' and sets all the bits of the B bit map 36 to '1'.

Here, as already explained, all the bits in the A bit map 34 correspond with all the storage locations in the main volume 40 (and of course also correspond with all the storage locations in the auxiliary volume 42). Similarly, all the bits in the B bit map 6 correspond with all the storage locations in the auxiliary volume 42 (and of course also correspond with all the storage locations in the main volume 40). Each of the bits in the A bit map 34 expresses whether the data which should be recorded in the corresponding storage location in the main volume 40 is recorded in that storage location (bit value '0') or whether it is recorded in the corresponding storage location in the auxiliary volume 42 (bit value '1'). And, each of the bits of the B bitmap 36 expresses whether the data that should be recorded in the corresponding storage location in the auxiliary volume 42 is recorded in that storage location (bit value '0'), or whether it is recorded in the corresponding storage location in the main volume 40 (bit value '1').

Accordingly, the A bit map 34 with all of its bit values set to '0' in the above-mentioned bit map initialization (S22) expresses the condition that the data which should be recorded in all the storage locations in the main volume 40 is correctly recorded in those storage locations. And, the B bit map 36 with all of its bit values set to '1' in the bit map initialization (S22) expresses the condition that the data which should be recorded in all the storage locations in the auxiliary volume 42 is recorded in the main volume 40.

Starting from this state, thereafter, every time it receives a write request, the disk system 3 performs the operations of steps S23 through S25 (equivalent to the synchronous copying and writing shown in FIG. 4) and the operations of steps S26 through S28 (equivalent to the sequential determination and advance copying as shown in FIG. 4). The operations of steps S26 through S28 are carried out in parallel or serially with the operations of steps S23 through S25.

In step S23, every time it receives a write request, the disk system 3 determines, for each storage location 70 in the main volume 40 to which data is to be written, on the basis of the corresponding bit value of the B bit map 36 (in the figure, the underlined bit value), whether or not synchronous copying is necessary. If that bit value is '1' (meaning that it belongs in the uncopied region 48 of FIG. 4), it determines that copying is necessary, and if the bit value is '0' (meaning that it belongs in the already copied region 46 of FIG. 4), it determines that copying is unnecessary. Immediately after the bit map initialization (S22), because all the bit values of the B bit map 36 are '1', for any storage location, it is determined that copying is necessary; but thereafter, whenever copying of a storage location is carried out, as will be discussed later, the bit value corresponding to that storage location is updated to '0', subsequently to which it will only be determined that copying is unnecessary.

In step S24, only when it was determined instep S23 that copying is necessary, the disk system 3 copies the present data in the storage location 70 to which data is to be written in the main volume 40 to the corresponding storage location 72 in the auxiliary volume 42, and rewrites the corresponding bit; value of the B bit map 36 (in the figure, the underlined bit value) from '1' to '0'.

In step S25, the disk system 3 writes new data received from the higher device 2 in the storage location 70 in the main volume 40 to which data is to be written.

In step S26, the disk system 3 determines whether or not the present writing is sequential writing.

In step S27, only when it has been determined in step S26 that it is sequential writing, the disk system 3 determines a sequential writing prediction range 74 of the main volume 40, and for each storage location in this sequential writing prediction range 74 determines the need or otherwise for advance copying on the basis of the corresponding bit value of the B bit map 36 (in the figure, the underlined bit values). If the bit value is '1' (meaning that it belongs in the uncopied region 48 of FIG. 4) then it is determined that copying is necessary, and if the bit value is '0' (meaning that it belongs in the already copied region 46 of FIG. 4) it is determined that copying is unnecessary.

In step S28, the disk system 3 copies the present data of any of the storage locations in the sequential writing prediction range 74 of which it was determined in step S23 that copying was necessary to the corresponding storage locations 76 in the auxiliary volume 42, and rewrites the corresponding bit values of the B bit map 36 (in the figure, the underlined bit values) from '1' to '0'.

Figure 7:
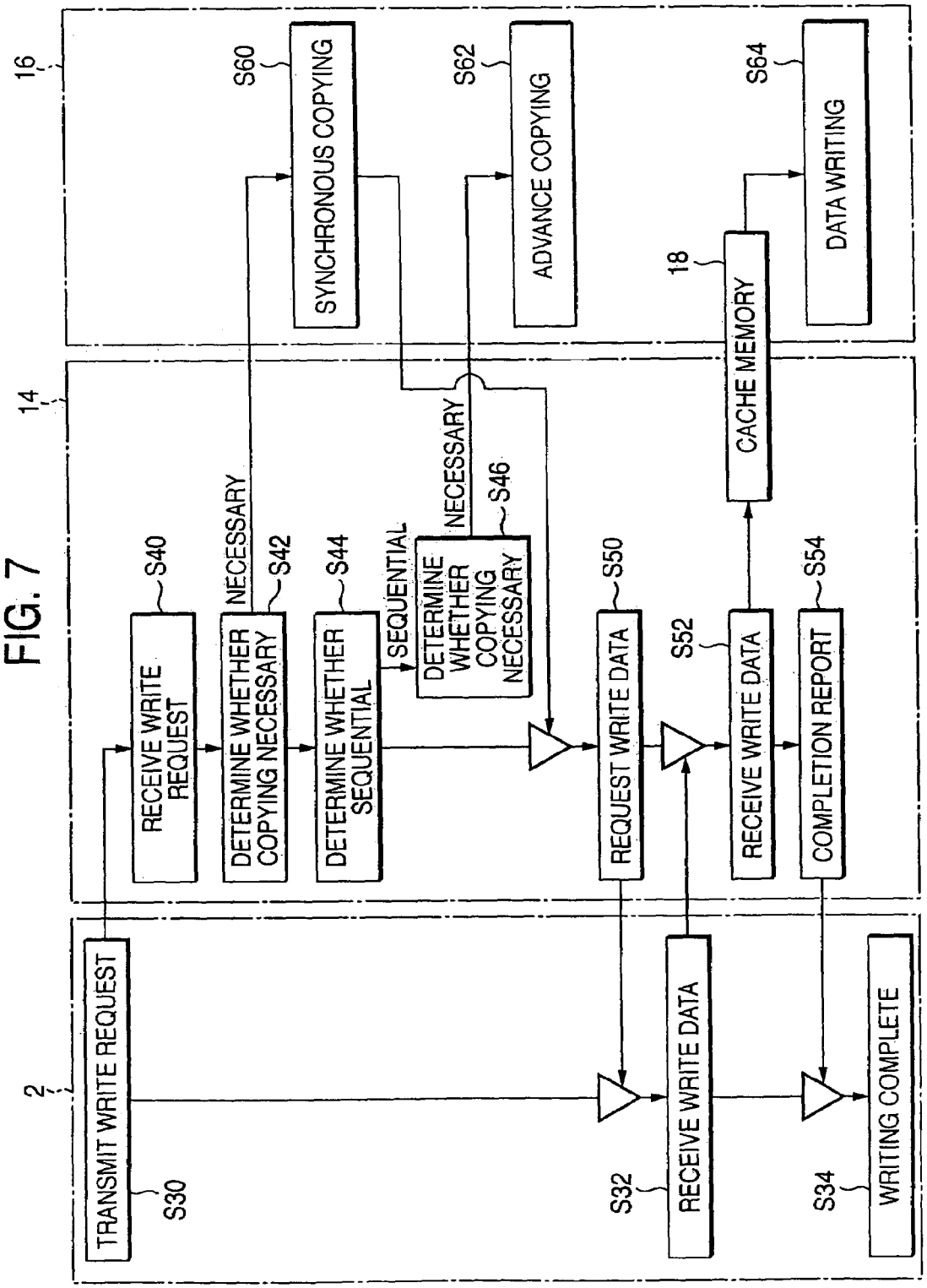
FIG. 7 is a flow chart showing more specifically the distribution of the roles of the CHAs 14 and DKAs 16 in the disk system 3 in the operation shown schematically in FIG. 4.

FIG. 7 shows more specifically the distribution of the roles between the CHA 14 and DKA 16 in the disk system 3 in the operation shown schematically in FIG. 4.

As shown in FIG. 7, when receiving a write request from the higher device 2 (S40), the CHA 14 in the disk system 3 determines for each target storage location in the main volume 40 of the write request whether or not synchronous copying is necessary by referring to the corresponding bit value of the B bit map 36 (S42), and when determining that copying is necessary requests synchronous copying from a DKA 16. In response to this, the DKA 16 executes the requested synchronous copying (S60) and updates the corresponding bit values of the B bit map 36.

And, the CHA 14 determines whether or not this writing is sequential writing (S44), and when it is sequential writing, it determines a sequential writing prediction range, and for each storage location in that sequential writing prediction range, it determines the necessity or otherwise of advance copying by referring to the corresponding bit map value of the B bit map 36 (S46), and only for the storage locations determined to need copying requests advance copying from the DKA 16. In response to this, the DKA 16 executes the requested advance copying (S62) and updates the corresponding bit values of the B bit map 36.

And, when in the above-mentioned step S42 it did not request synchronous copying from the DKA 16, immediately after this step S42, or, when in step S42 it did request synchronous copying from the DKA 16, immediately after that synchronous copying is finished, the CHA 14 requests the data to be written (write data) from the higher device 2 (S50). Then, when it receives the write data from the higher device 2 (S52), the CHA 14 writes the received data to the cache memory 18 and orders write processing from the DKA 16. After that, the DKA 16 reads out the write data from the cache memory 18 and writes it to the target storage locations in the main volume 40 (S64).

When it orders write processing from the DKA 16 in step S52, the CHA 14 sends a completion report to the higher device 2 (S54). The higher device 2 receives the completion report and recognizes that the present write processing has been completed (S34).

The foregoing is a description of a typical example of the case of taking a snapshot of the main volume 40.

Figure 8:
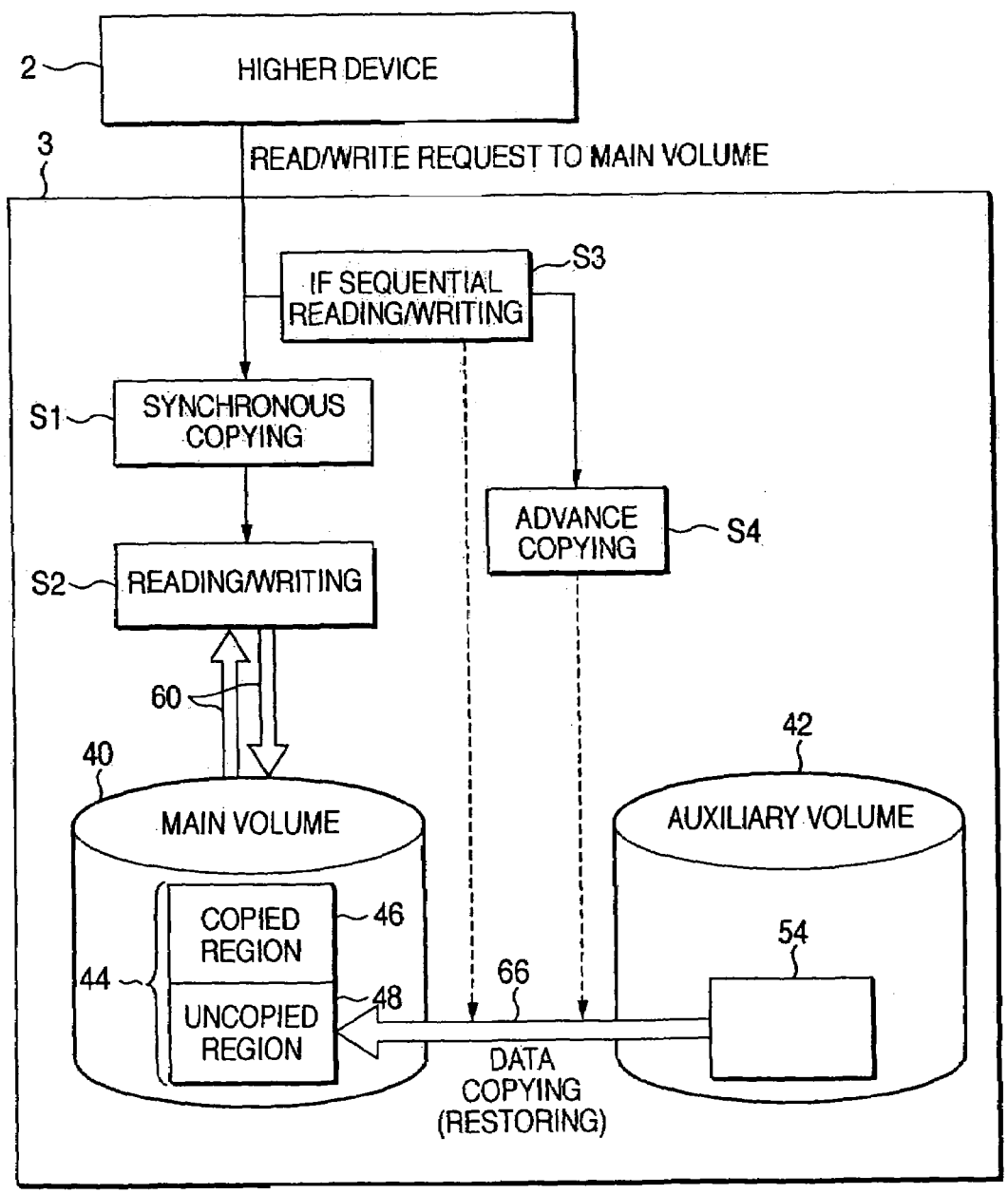
FIG. 8 is a flow chart showing the operation of the disk system 3 in a case of restoring (copying back) a snapshot to the main volume 40 on reading/writing of data to the main volume 40.

Next, a typical example of the case of restoring (return copying) a snapshot taken as described above to the main volume 40 will be described. FIG. 8 shows the operation flow of the disk system 3 in this case.

At a desired time after a designated snapshot time, the higher device 2 can send a snapshot restore request (hereinafter, restore request) to the disk system 3, and also a user can send a restore request to the disk system 3 by operating the console 24. For example, a restore request can be sent to the disk system 3 when erroneous data has been written to a certain storage location in the main volume 40. At the time when it receives the restore request (hereinafter, the designated restore time), the disk system 3 ceases the operations for snapshot acquisition described above and thereafter executes the operations for snapshot restoration shown in FIG. 8 every time it receives a read or write request (hereinafter, read/write request) from the higher device 2 pertaining to the main volume 40.

As shown in FIG. 8, the disk system 3, in response to a read or write request pertaining to the main volume 40 from the higher device 2, first performs synchronous copying (S1) to the target storage region of the read/write request in the main volume 40. However, synchronous copying (S1) is only executed when it is 'regarded' that copying to that target storage region for restoration has not been executed between the designated snapshot time and the present time (as will be further discussed later, for storage regions of which copying for snapshot acquisition has not been executed by the designated restore time, thereafter, even though copying for restoration has not been executed, it is 'regarded' that copying for restoration has been executed already). In this synchronous copying (S1), data presently recorded in the storage region in the auxiliary volume 42 corresponding to the target storage region in the main volume 40 (this is the snapshot of the target storage region) is copied to the target storage region of the main volume 40, as shown by the arrow 66.

After this synchronous copying (S1), the disk system 3 performs the reading or writing requested by the higher device 2 on the target storage region (S2).

Also, when it is determined that this access is sequential access, the disk system 3 performs advance copying to a sequential access prediction range of the main volume 40 (S4). In the sequential access prediction range, advance copying (S4) is executed only for storage regions of which it is 'regarded' that copying for restoration has not been executed between the designated snapshot time and the present time (as will be further discussed later, for storage regions of which copying for snapshot acquisition has not been executed by the designated restore time, thereafter, even though copying for restoration has not been executed, it is regarded that copying for snapshot restoration has been executed already). In this advance copying (S4), data presently recorded in storage regions in the auxiliary volume 42 corresponding to object storage regions in the main volume 40 (this is the snapshot of the above-mentioned object storage regions) is copied to the object storage regions of the main volume 40, as shown by the arrow 66.

Ultimately, if the range made up of the target storage region and the sequential access prediction range following this in the main volume 40 is the range 44 shown in the figure, only with respect to the uncopied region (that is, the region of which it is 'regarded' that copying for restoration has not been executed) 48 of this range 44 is snapshot data copied from the corresponding uncopied region 54 in the auxiliary volume 42 by synchronous copying (S1) and advance copying (S4).

Thereafter, the series of operations described above (S1 to S4) is executed again each time a subsequent read/write request arrives.

Figure 9:
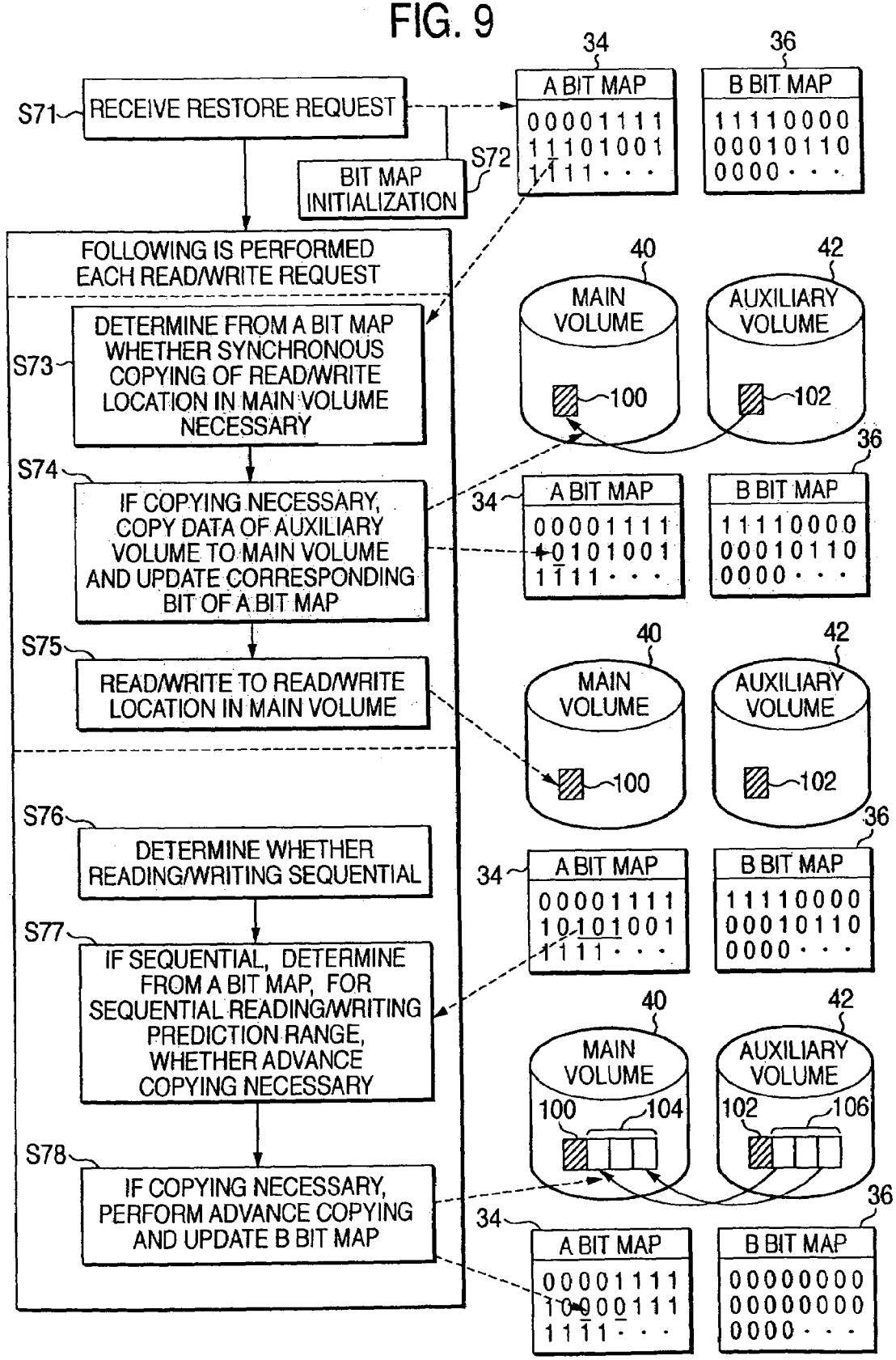
FIG. 9 is a flow chart showing more specifically how bit maps 34, 36 are used in the operation shown schematically in FIG. 8.

FIG. 9 shows more specifically how the bit maps 34, 36 are used in the operation shown schematically in FIG. 8.

As shown in FIG. 9, the disk system 3, when it receives a restore request (S71), first performs bit map initialization (S72). In this bit map initialization (S72), the opposite values of all the bit values of the B bit map 36 are set as all the bit values of the A bit map 34. In the B bit map 36, at the designated restore time, bit values of which the snapshot of the corresponding storage locations in the main volume 40 is recorded in the corresponding storage locations in the auxiliary volume 42 are at '0', and bit values where the snapshot has not been copied to the auxiliary volume 42 (that is, it is still recorded in the corresponding storage locations in the main volume 40) are at '1'. Therefore, as a result of the inverse state of the B bit map 36 being set as the A bit map 34, in the A bit map 34, at the designated restore time, the bit values of which the snapshot of the corresponding storage locations in the main volume 40 has been recorded in the corresponding storage locations in the auxiliary volume 42 are '1', and the bit values of which the snapshot of the corresponding storage locations in the main volume 40 is still recorded in those storage locations are at '0'.

Starting from this state, thereafter, every time it receives a read/write request, the disk system 3 performs the operations of steps. S73 through S75 (equivalent to the synchronous copying and reading/writing shown in FIG. 8) and the operations of steps S76 through S78 (equivalent to the sequential determination and advance copying shown in FIG. 8). The operations of steps S76 through S78 are carried out in parallel or serially with the operations of steps S73 through S75.

In step S73, for a storage location 100 constituting the target of reading/writing in the main volume 40, on the basis of the corresponding bit value of the A bit map 34 (in the figure, the underlined bit value), the disk system 3 determines whether or not synchronous copying is necessary. If that bit value is '1', because it means that the snapshot of that target storage location 100 has been recorded in the auxiliary volume 42 (in other words, it is regarded that copying for restoration has not been executed), it is determined that copying is necessary. If on the other hand the bit value is '0' because it means that the snapshot of that target storage location 100 has already been recorded in that storage location (in other words, it is regarded that copying for restoration has already been executed), it is determined that copying is not necessary.

In step S74, only when it was determined in S73 that copying is necessary, the disk system 3 copies (restores) to the target storage location 100 in the main volume 40 the snapshot data recorded in the corresponding storage location 102 in the auxiliary volume 42, and rewrites the corresponding bit value of the A bit map 34 (in the figure, the underlined bit value) from '1' to '0'.

In step S75, the disk system 3 performs the reading/writing requested by the higher device 2 on the target storage location 100 in the main volume 40.

In step S76, the disk system 3 determines whether or not the present access is a sequential access.

In step S77, only when it was determined in S76 that the access was a sequential access, the disk system 3 determines a sequential access prediction range 104 of the main volume 40, and for each storage location of that sequential access prediction range 104, it determines on the basis of the corresponding bit value of the A bit map 34 (in the figure, the underlined bit values) whether or not advance copying is necessary. If the bit value is '1', because it is regarded that copying for restoration has not been executed, it is determined that copying is necessary. If on the other hand the bit value is '0', because it is regarded that copying for restoration has already been executed, it is determined that copying is not necessary.

In step S78, only for storage locations in the sequential access prediction range 104 of which it was determined in S73 that copying is necessary, the disk system 3 copies to them the snapshot data recorded in the corresponding storage locations in the auxiliary volume 42 and rewrites the corresponding bit values of the A bit map 34 (in the figure, the underlined bit values) from '1' to '0'.

Figure 10:
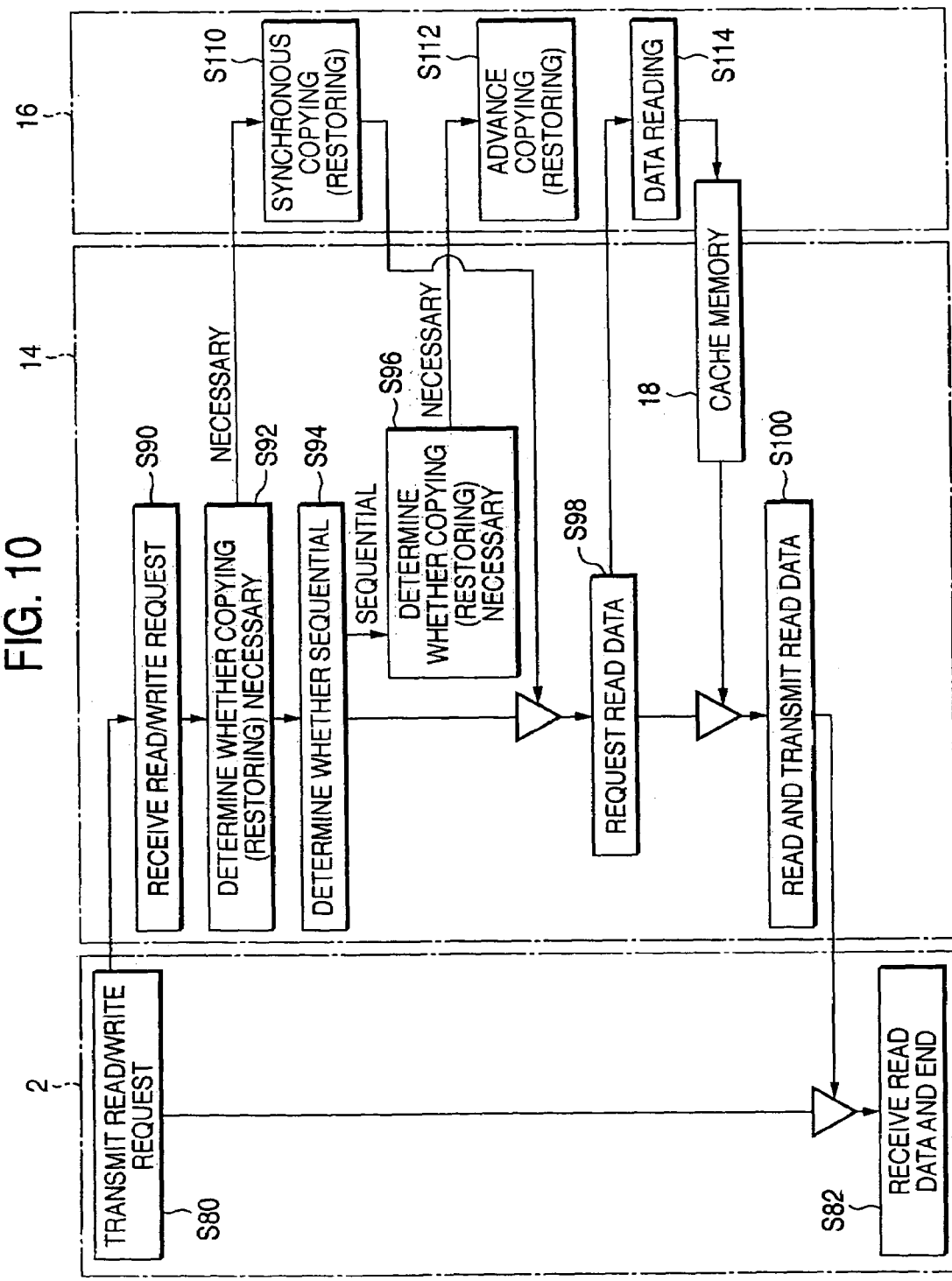
FIG. 10 is a flow chart showing more specifically the distribution of the roles of the CHAs 14 and DKAs 16 in the disk system 3 in the operation shown schematically in FIG. 8.

FIG. 10 shows more specifically the distribution of roles between the CHA 14 and the DKA 16 in the disk system 3 in the operation shown schematically in FIG. 8.

As shown in FIG. 10, when it receives a read/write request from the higher device 2 (S90), a CHA 14 in the disk system 3 determines for the target storage locations of the read/write request in the main volume 40 whether or not synchronous copying is necessary, by referring to the corresponding bit values in the A bit map 34, and when determining that copying is necessary requests synchronous copying from the DKA 16. In response to this, the DKA 16 executes the requested synchronous copying (S110), and updates the corresponding bit values of the A bit map 34.

And, the CHA 14 determines whether or not this reading/writing is a sequential access (S94), and when it was a sequential access, it determines a sequential access prediction range and determines for each of the storage locations in that sequential, access prediction range whether or not advance copying is necessary by referring to the corresponding bit value of the A bit map 34 (S96), and only for the storage locations of which it was determined that copying is necessary, it requests advance copying from the DKA 16. In response to this, the DKA 16 executes the requested advance copying (S112) and updates the corresponding bit values of the B bit map 36.

And, when in step S92 it did not request synchronous copying from the DKA 16, immediately after that step S92, or, when in step S92 it did request synchronous copying from the DKA 16, immediately after that synchronous copying is finished, the CHA 14 performs the requested reading or writing operation. Because a writing operation is the same as step 350 onward shown in FIG. 7, here, a reading operation will be described. First, the CHA 14 requests data reading from the DKA 16 (S98). In response to this, the DKA 16 reads out read data from the above-mentioned target storage region of the main volume 40 and writes it to the cache memory 18 (S114). The CHA 14 reads the data from the cache memory 18 and sends it to the higher device 2 (S100). The higher device 2 receives the read data and recognizes that the present read processing has been completed (S82).

The foregoing is a typical operation in the case of restoring a snapshot.

In both of the two typical cases described above, copying for snapshot acquisition or restoration is carried out at times of accessing of the main volume 40. However, there may also be cases of this type of copying being carried out at times of accessing of the auxiliary volume 42. Two operation examples of such cases are shown in FIG. 11 and FIG. 12.

Figure 11:
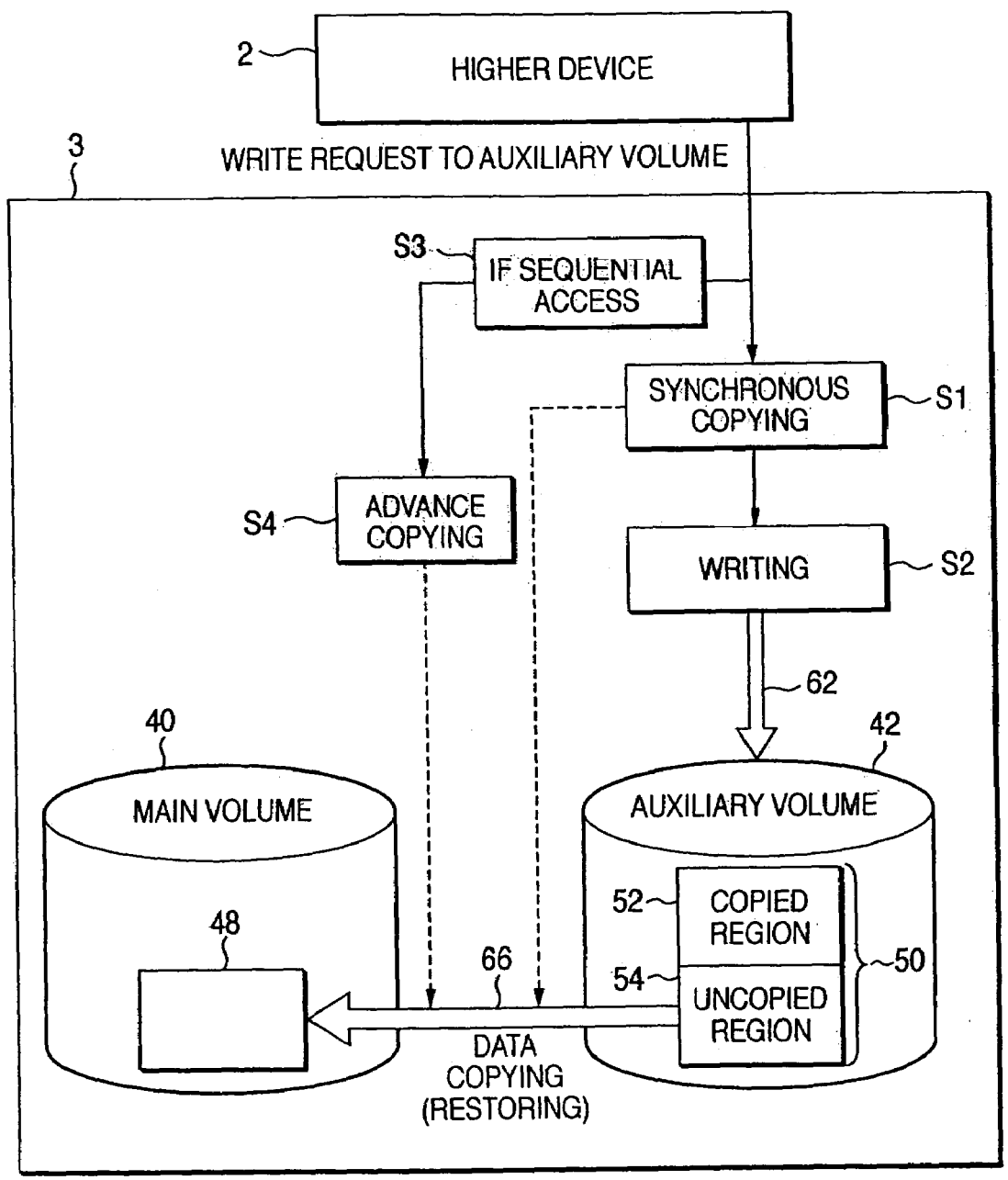
FIG. 11 is a flow chart showing the operation of a disk system 3 in a case of restoring a snapshot on writing data to an auxiliary volume 42.
Figure 12:
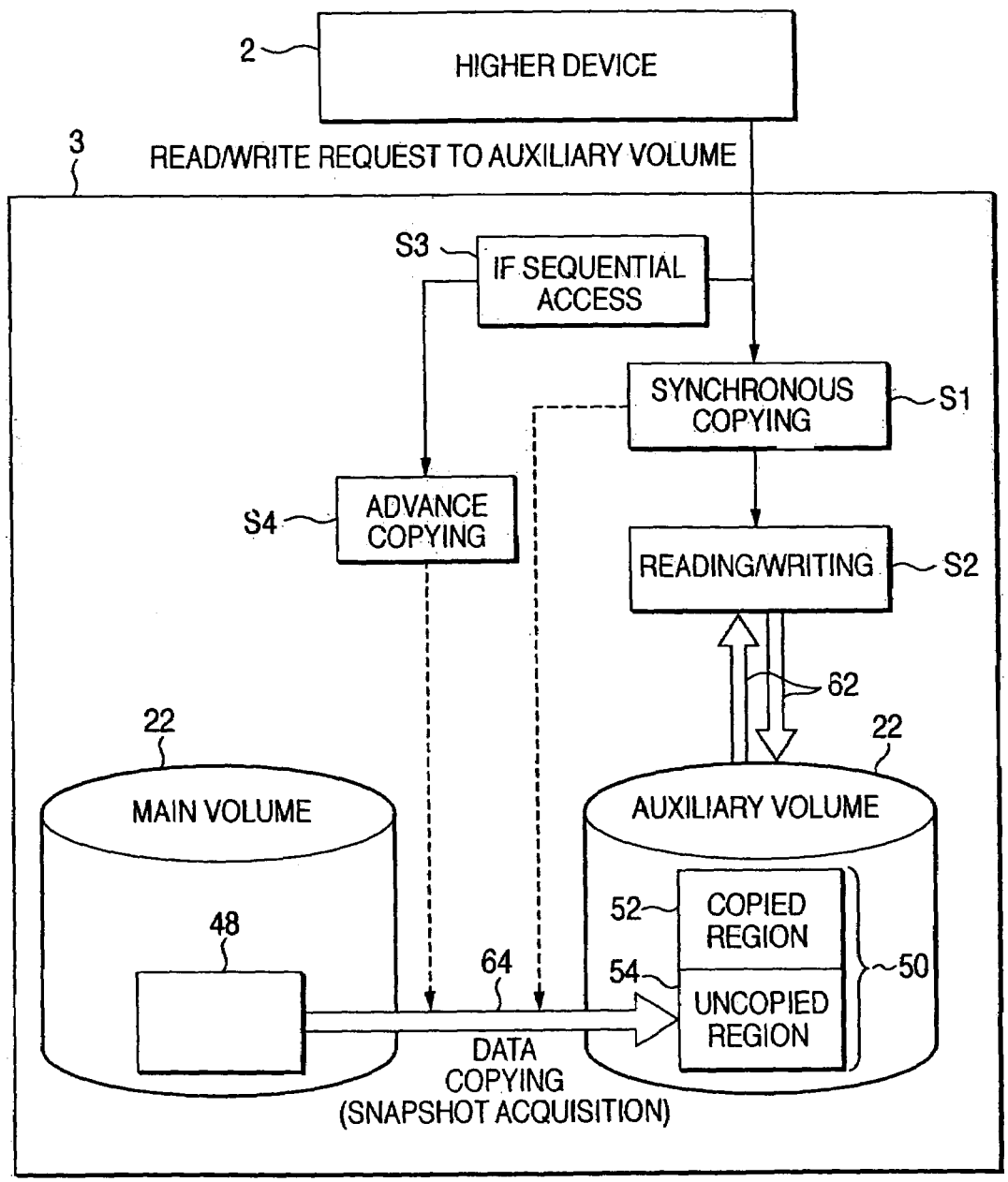
FIG. 12 is a flow chart showing the operation of the disk system 3 in a case of taking a snapshot on reading or writing to a auxiliary volume 42.

FIG. 11 shows an operation example of the case of restoring a snapshot on data writing to the auxiliary volume 42.

As shown in FIG. 11, after it receives a restore request, every time a write request pertaining to the auxiliary volume 42 arrives, the disk system 3 performs copying for snapshot restoration (S1, S4, arrow 66) from the target storage region of the write request in the auxiliary volume 42 and a sequential writing prediction range following that to the corresponding storage region in the main volume 40. In this case also, by the bit maps 34, 36 being used in the same way as explained with reference to FIG. 9, the copying (S1, S4) is carried out only for any uncopied region (region of which it is regarded that copying for restoration has not been executed) 54 of a sequential writing range 50 in the auxiliary volume 42.

Applications for which the operation shown in FIG. 11 is carried out, for example, include cases such as writing test data for development to the auxiliary volume 42.

FIG. 12 shows an operation example in a case of taking a snapshot on data reading/writing to the auxiliary volume 42.

As shown in FIG. 12, after receiving a snapshot acquisition request, every time a read/write request pertaining to the auxiliary volume 42 arrives, the disk system 3 copies to the target storage region of the read/write request and a sequential writing prediction range following that in the auxiliary volume 42 the data recorded in the corresponding storage region in the main volume 40 (S1, S4). In this case also, by the bit maps 34, 36 being used in the same way as explained with reference to FIG. 6, the copying (S1, S4) is carried out only for an uncopied region (region of which copying for snapshot acquisition has not been executed) 54 of a sequential reading/writing range 50 in the auxiliary volume 42.

Applications of the operation of performing snapshot acquisition on data reading shown in FIG. 12, for example, include cases such as creating a backup copy. And, applications of the operation of performing snapshot acquisition on data writing, for example, include cases such as testing for development.

A number of specific cases have been described above, and all of these cases involve performing copying for snapshot acquisition or restoration at times of accessing a volume. However, if this type of copying is not executed at times of accessing a volume, the response of the disk system 3 at times of accessing a volume improves greatly. To achieve this, it is possible to employ, instead of or in addition to the copying on volume accessing described above, the method of executing this type of copying on a large scale in advance, at a different occasion from volume accessing. Advance copying at a different occasion like this is effective if carried out, for example, in a time slot in which there is no volume accessing, or in the intervals at times when the frequency of volume accesses is low.

Figure 13:
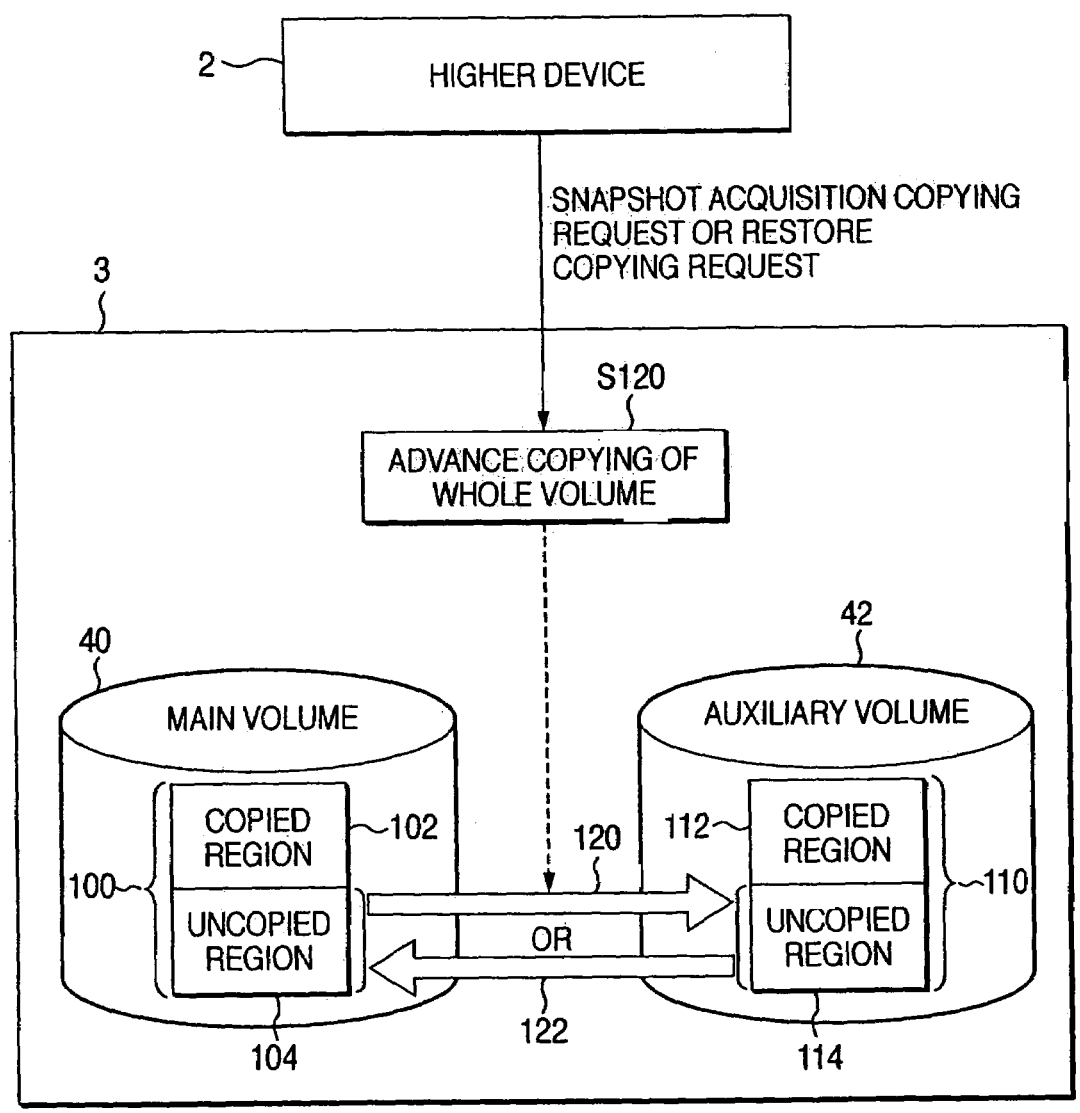
FIG. 13 is a flow chart showing the operation of the disk system 3 in a case of performing advance copying at a different time from when the volume is accessed.

FIG. 13 shows the operation flow of the disk system 3 in a case where advance copying is carried out on a different occasion from volume accessing.

As shown in FIG. 13, when at any time the disk system 3 receives a copying request for snapshot acquisition of the main volume 40 from the higher device 2 (or the console 24), for the whole range 100 of the main volume 40, it executes advance copying for snapshot acquisition (S120), However, in the whole range 100 of the main volume 40, no advance copying (S120) is done of an already copied region 102 of which copying for snapshot acquisition has already been executed between the designated snapshot time and the present, and advance copying (S120) is only executed on an uncopied region 104, on which this copying has not yet been executed. In this advance copying (S120), data is copied from the main volume 40 to the auxiliary volume 42, as shown by the arrow 120. The determination of whether or not copying for snapshot acquisition has already been executed can be carried out on the basis of the corresponding bit values of the B bit map 36, as already explained with reference to FIG. 6.

And, when at any time the disk system 3 receives from the higher device 2 (or the console 24) a copying request for restoring a snapshot of the main volume 40, (if a restore request has not been received until now, after initializing the A bit map 34 as in step S72 of FIG. 9) it executes advance copying (S120) for restoration on the whole range 100 of the main volume 40. However, in the whole range 100 of the main volume 40, no advance copying (S120) is done to an already copied region 102, to which it is regarded that copying for restoration has already been executed between the designated snapshot time and the present, and advance copying (S120) is only executed for an uncopied region 104, to which it is regarded that this copying has not yet been executed. In this advance copying (S120), data is copied from the auxiliary volume 42 to the main volume 40, as shown by the arrow 122. The determination of whether or not it is regarded that copying for restoration has been already executed can be carried out on the basis of the corresponding bit values of the A bit map 34, as already explained with reference to FIG. 9.

Figure 14:
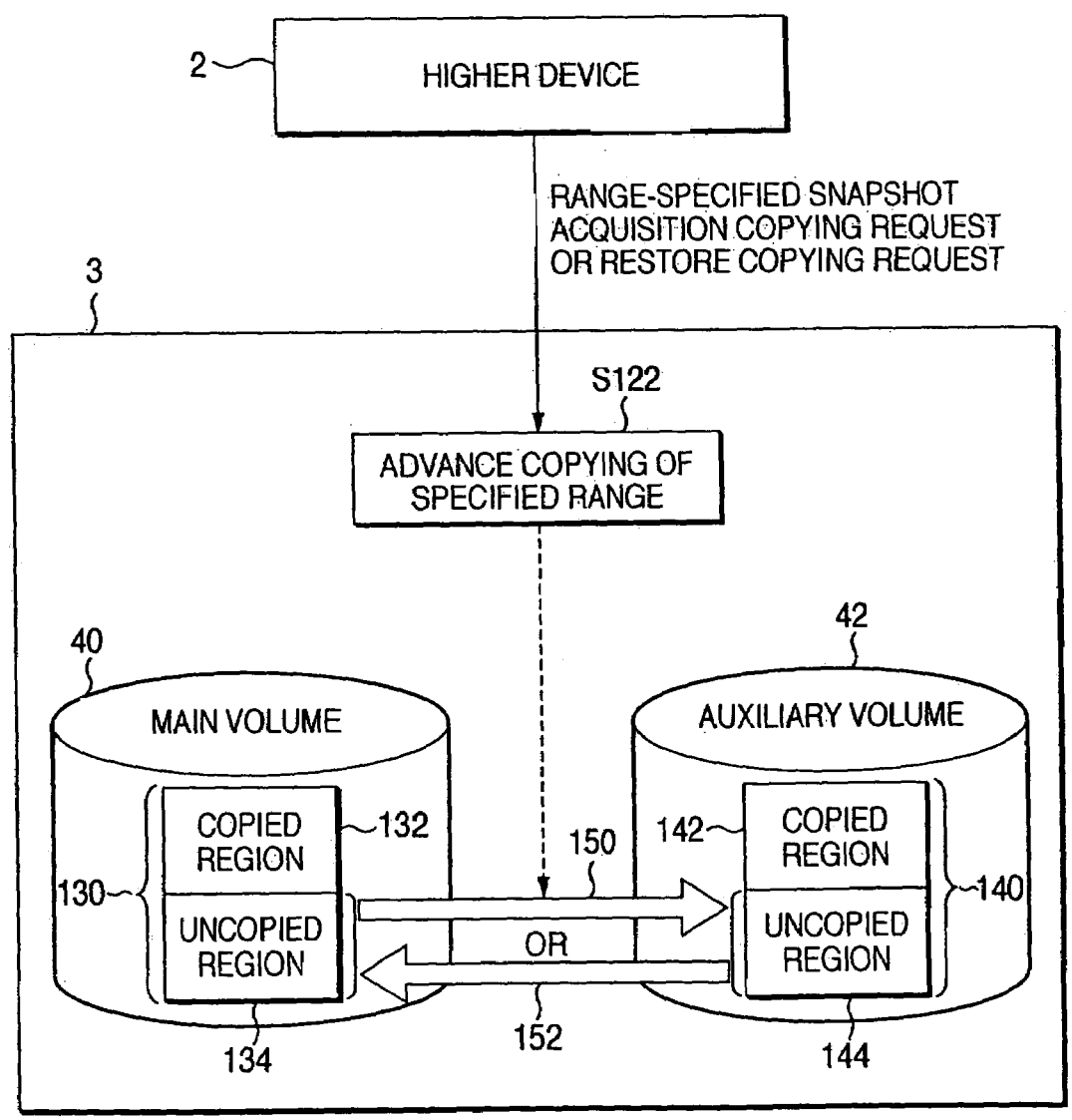
FIG. 14 is a flow chart showing the operation of a disk system 3 in a different case of performing advance copying at a different time from when the volume is accessed.

Although in the operation of FIG. 13 described above the whole of the main volume 40 was made the object of advance copying at a different occasion, as a different method, alternatively, the object of the advance copying at a different occasion can be limited to a specified range within the volume. FIG. 14 shows the operation flow of the disk system 3 in such a case.

As shown in FIG. 14, when at any time the disk system 3 receives from the higher device 2 (or the console 24) a range specified copying request for snapshot acquisition in which a range in the main volume 40 is specified, for the specified range 130 in the main volume 40, it executes advance copying for snapshot acquisition (S122). However, no advance copying (S122) is done for an already copied region 132 in the specified range 130, from which copying for snapshot acquisition has already been executed between the designated snapshot time and the present, and advance copying (S122) is only executed for an uncopied region 134, from which this copying has not yet been executed. In this advance copying (S122), data is copied from the main volume 40 to the auxiliary volume 42, as shown by the arrow 150. The determination of whether or not copying for snapshot acquisition has been already executed can be carried out on the basis of the corresponding bit values of the B bit map 36, as already explained with reference to FIG. 6. The above-mentioned range specification can be carried out using a cylinder number and head number, LBAs, or a file identifier or the like.

And, when at any time the disk system 3 receives from the higher device 2 (or the console 24) a range specified copying request for snapshot restoration in which a range in the main volume 40 is specified, (if a restore request has not been received until now, after initializing the A bit map 34 as in step S72 of FIG. 9) for the specified range 130 in the main volume 40, it executes advance copying for restoration (S122): However, no advance copying (S122) is done to an already copied region 132 in the specified range 130, to which it is regarded that copying for restoration has already been executed between the designated snapshot time and the present, and advance copying (S122) is only executed on an uncopied region 134, to which it is regarded that this copying has not yet been executed. In this advance copying (S122), data is copied from the auxiliary volume 42 to the main volume 40, as shown by the arrow 152. The determination of whether or not it is regarded that copying for restoration has been already executed can be carried out on the basis of the corresponding bit values of the A bit map 34, as already explained with reference to FIG. 9.

Finally, the operation which is carried out when a snapshot is read out to create a backup will be described.

When a backup is to be created, read requests for the auxiliary volume 42 from the higher device 2 reach the disk system 3 continuously. In this case, the disk system 3, by performing the operation shown in FIG. 12 every time a read request for the auxiliary volume 42 arrives, while copying a snapshot from the main volume 40 to the auxiliary volume 42, can readout that snapshot from the auxiliary volume 42 and send it to a backup recording device either inside or outside the disk system 3.

Figure 15:
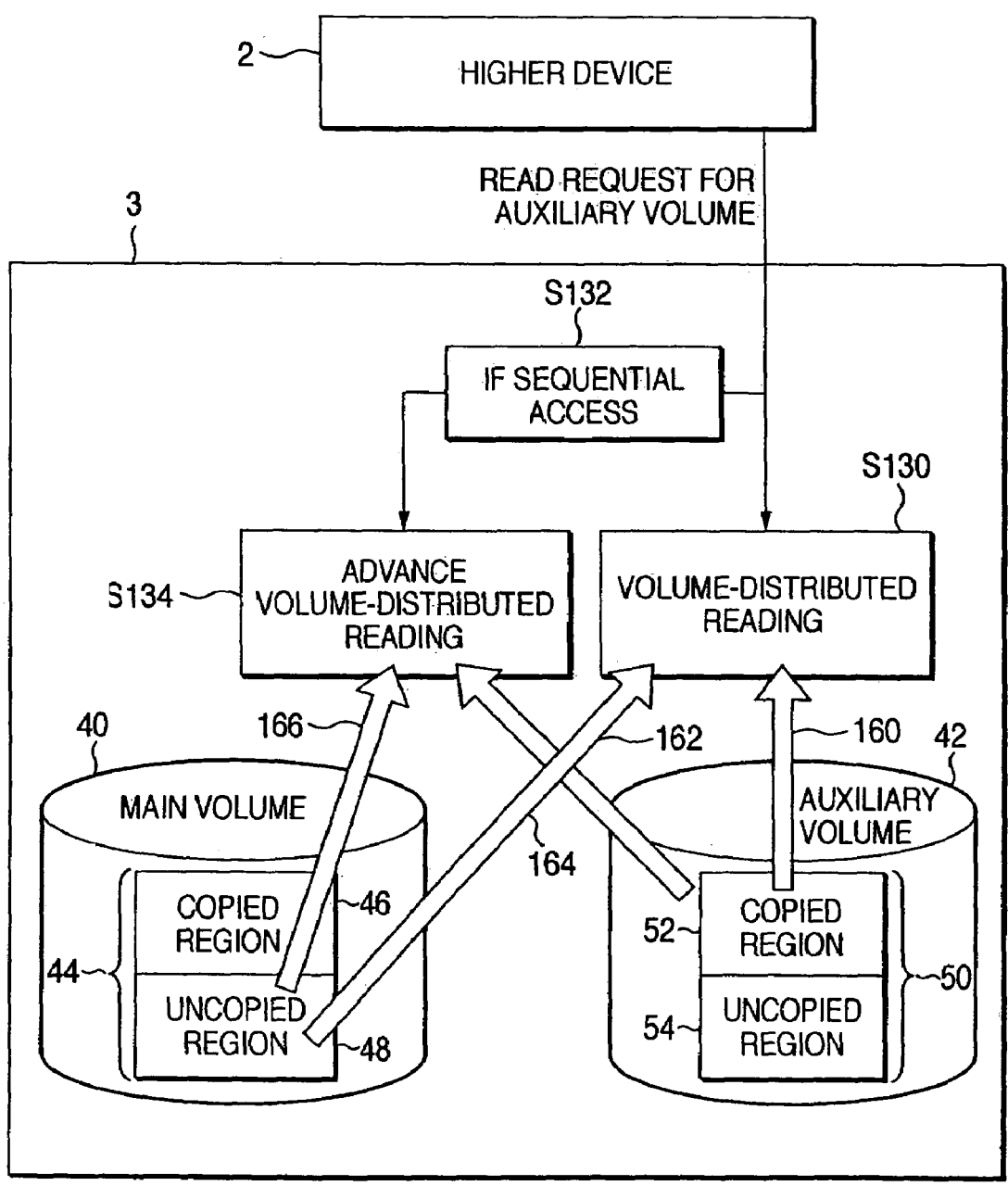
FIG. 15 is a flow chart showing the operation of the disk system 3 in a case of performing data reading for creating a backup.

In the case of creating a backup, instead of the operation shown in FIG. 12, the kind of operation shown in FIG. 15 can alternatively be carried out.

As shown in FIG. 15, when creating a backup, every time a read request to the auxiliary volume 42 arrives, the disk system 3 performs read processing, which is called 'volume distributed reading' in this specification, on the target storage region of the read request in the auxiliary volume 42 (S130). In this volume distributed reading (S130), first, for that target storage region, it is checked whether or not copying for snapshot acquisition has already been executed between the designated snapshot time and the present, and then, if the result of the check is that such copying has already been executed, data is read out from that target storage region in the auxiliary volume 42, and if on the other hand such copying has not been executed, data is read out from the storage locations in the main volume 40 corresponding to the target storage region. Thus, in volume distributed reading (S130), on the basis of whether or not there has been execution of copying up to now, it is determined which of the main volume 40 and the auxiliary volume 42, the snapshot data is recorded in, and data is read from the volume where it is recorded. The determination of whether or not there has been execution of copying up to now can be made using the corresponding bit values of the B bit map 36 in the same way as in step S23 of FIG. 6 explained above.

And, when it is determined that the read request from the higher device 2 is a sequential reading (S132) (reading for backup is normally sequential), the disk system 3, either in parallel or serially with the volume distributed reading (S130) of the target storage region, can perform what in this specification is called 'advance volume distributed reading' (S134) on a sequential access prediction range following the target storage region. In this advance volume distributed reading (S134), first, for all the storage locations in the sequential access prediction range, it is checked whether or not copying for snapshot acquisition has been executed already between the designated snapshot time and the present, and if the result of this check is that such copying has already been executed, data is read out from that storage location in the auxiliary volume 42, and if on the other hand such copying has not been executed, data is read put from the storage location in the main volume 40 corresponding to that storage location. In this way, in advance volume distributed reading (S134) also, on the basis of whether or not there has been execution of copying up to now, it is determined which of the main volume 40 and the auxiliary volume 42 the snapshot data is recorded in, and data is read from the volume where it is recorded. The determination of whether or not there has been execution of copying up to now can be made using the corresponding bit values of the B bit map 36 in the same way as in step 327 of FIG. 6 explained above.

Compared to the operation shown in FIG. 12, the operation shown in FIG. 15 imposes a lighter processing load, because the number of data operations is smaller. That is, in the operation in FIG. 12, snapshot data still recorded in the main volume 40 at the time when backup creation is requested is read out from the main volume 40 after being copied from the main volume 40 to the auxiliary volume 42 (that is, after being read out from the main volume 40 and written to the auxiliary volume 42). In the operation shown in FIG. 15, on the other hand, because such data is just read out from the main volume 40, the process of writing to the auxiliary volume 42 in the operation of FIG. 12 is dispensed with, and, consequently, the processing load is lower.

Although a presently preferred embodiment of the invention has been described above, this is merely an example for illustrating the invention, and the scope of the invention is of course not limited to this preferred embodiment. Accordingly, various changes are possible within the scope of the appended claims.

What is claimed is:

1. A storage system having a first volume and a second volume, the storage system comprising, for when it has received a snapshot acquisition request from a computer requesting the taking of a snapshot of the first volume pertaining to a designated time:

first synchronous copying means for, after the designated time, receiving a data access request from the computer with a storage region in the first volume as a target, and, if data recorded in the target storage region in the first volume has not been copied to the second volume since the designated time, copying data recorded in the target storage region to the second volume; and first advance copying means for, after the designated time, predicting a storage region in the first volume to be the target of a data access request from the computer in the future, and, if data recorded in the predicted storage region has not been copied to the second volume since the designated time, copying data recorded in the predicted storage region to the second volume in response to said first synchronous copying means receiving said data access request from the computer.

2. A storage system having a first volume and a second volume, the storage system comprising, for when it has received a snapshot acquisition request from a computer requesting the taking of a snapshot of the first volume pertaining to a designated time;

first synchronous copying means for, after the designated time, receiving a data access request from the computer with a storage region in the second volume as a target, and, if data recorded in a storage region in the first volume corresponding with the target storage region in the second volume has not been copied to the target storage region since the designated time, copying data recorded in the storage region in the first volume corresponding with the target storage region in the second volume to the target storage region; and first advance copying means for, after the designated time, predicting a storage region in the second volume to be the target of a data access request from the computer in the future, and, if data recorded in a storage region has not been copied to the predicted storage region since the designated time, copying data recorded in the storage region in the first volume corresponding with the predicted storage region in the second volume to the predicted storage region in response to said first synchronous copying means receiving said data access request from the computer.

3. A storage system according to claim 1, further comprising, for when after the designated time it has received a restore request from the computer requesting the restoring to the first volume of the snapshot of the first volume pertaining to the designated time:

second synchronous copying means for, after the restore request is received from the computer, receiving a data access request from the computer with a storage region in the first volume as a target, and, if it is regarded that data recorded in a storage region in the second volume corresponding with the target storage region in the first volume has not been copied to the target storage region since the designated time, copying data recorded in the storage region of the second volume corresponding with the target storage region to the target storage region in response to said second synchronous copying means receiving said data access request from the computer; and second advance copying means for, after the restore request is received from the computer, predicting a storage region in the first volume to be the target of a data access request from the computer in the future, and, if it is regarded that data recorded in a storage region in the second volume corresponding with the predicted storage region has not been copied to the predicted storage region since the designated time, copying data recorded in the storage region in the second volume corresponding with the predicted storage region to the predicted storage region in response to said second synchronous copying means receiving said data access request from the commuter.

4. A storage system according to claim 1, further comprising, for when after the designated time it has received a restore request from the computer requesting the restoring to the first volume of the snapshot of the first volume pertaining to the designated time:

second synchronous copying means for, after the restore request is received from the computer, receiving a data access request from the computer with a storage region in the second volume as a target, and, if it is regarded that data recorded in the target storage region in the second volume has not been copied to the first volume since the designated time, copying data recorded in the target storage region to the first volume in response to said second synchronous copying means receiving said data access request from the computer; and second advance copying means for, after the restore request is received from the computer, predicting a storage region in the second volume to be the target of a data access request from the computer in the future, and, if it is regarded that data recorded in the predicted storage region has not been copied to the first volume since the designated time, copying data recorded in the predicted storage region to the first volume in response to said second synchronous copying means receiving said data access request from the computer.

5. A storage system according to claim 1, further comprising second advance copying means for, when after the designated time an advance copying request for snapshot acquisition is received from the computer, performing the same copying operation as the first advance copying means for the whole range or a specified range of the first volume.

6. A storage system according to claim 3, further comprising third advance copying means for, when after the restore request is received from the computer, an advance copying request for snapshot restoration is received from the computer, performing the same copying operation as the second advance copying means for the whole range or a specified range of the second volume.

7. A storage system according to claim 2, further comprising, for when after the designated time the snapshot of the first volume at the designated time is to be read out:
    reading means for selectively reading, of data recorded in a storage region of the first volume, data which has not been copied to the second volume since the designated time; and
    reading means for selectively reading, of data recorded in a storage region of the second volume, data which has been copied there from the first volume since the designated time.

8. In a storage system having a first volume and a second volume, a method for taking a snapshot of the first volume pertaining to a designated time in response to a snapshot acquisition request received from a computer, the method comprising:
    a first synchronous copying step of, after the designated time, receiving a data access request from the computer with a storage region in the first volume as a target, and, if data recorded in the target storage region in the first volume has not been copied to the second volume since the designated time, copying data recorded in the target storage region to the second volume; and
    a first advance copying step of, after the designated time, predicting a storage region in the first volume to be the target of a data access request from the computer in the future, and, if data recorded in the predicted storage region has not been copied to the second volume since the designated time, copying data recorded in the predicted storage region to the second volume in response to receiving said data access request from the computer.

9. In a storage system having a first volume and a second volume, a method for taking a snapshot of the first volume pertaining to a designated time in response to a snapshot acquisition request received from a computer, the method comprising:
    a synchronous copying step of, after the designated time, receiving a data access request from the computer with a storage region in the second volume as a target, and, if data recorded in a storage region in the first volume corresponding with the target storage in the second volume has not been copied to the target storage region since the designated time, copying data recorded in the storage region in the first volume corresponding with the target storage region of the second volume to the target storage region; and
    an advance copying step of, after the designated time, predicting a storage region in the second volume to be the target of a data access request from the computer in the future, and, if data recorded in a storage region in the first volume corresponding with the predicted storage region has not been copied to the predicted storage region since the designated time, copying data recorded in the storage region in the first volume corresponding with the predicted storage region in the second volume to the predicted storage region in response to receiving said data access request from the computer.

10. A method according to claim 8, further comprising:
    a step of, after the designated time, receiving a restore request from the computer requesting the restoring to the first volume of the snapshot of the first volume pertaining to the designated time;
    a second synchronous copying step of, after the restore request is received from the computer, receiving a data access request from the computer with a storage region in the first volume as a target, and, if it is regarded that data recorded in a storage region in the second volume corresponding with the target storage region in the first volume has not been copied to the target storage region since the designated time, copying data recorded in the storage region of the second volume corresponding with the target storage region to the target storage region in response to receiving said data access request from the computer in said second synchronous copying step; and
    a second advance copying step of, after the restore request is received from the computer, predicting a storage region in the first volume to be the target of a data access request from the computer in the future, and, if it is regarded that data recorded in a storage region in the second volume corresponding with the predicted storage region has not been copied to the predicted storage region since the designated time, copying data recorded in the storage region in the second volume corresponding with the predicted storage region to the predicted storage region in response to receiving said data access request from the computer in said second synchronous copying step.

11. A method according to claim 8, further comprising:
    a step of, after the designated time, receiving a restore request from the computer requesting the restoring to the first volume of the snapshot of the first volume pertaining to the designated time;
    a second synchronous copying step of, after the restore request is received from the computer, receiving a data access request from the computer with a storage region in the second volume as a target, and, if it is regarded that data recorded in the target storage region in the second volume has not been copied to the first volume since the designated time, copying data recorded in the target storage region to the first volume in response to receiving said data access request from the computer in said second synchronous copying step; and
    a second advance copying step of, after the restore request is received from the computer, predicting a storage region in the second volume to be the target of a data access request from the computer in the future, and, if it is regarded that data recorded in the predicted storage region has not been copied to the first volume since the designated time, copying data recorded in the predicted storage region to the first volume in response to receiving said data access request the computer in said second synchronous copying step.

12. A storage system having a storage domain on which are performed writing and reading of data in response to commands from a computer, the storage system comprising:
    a storage control part for controlling the writing and reading of data in response to commands from a computer;
    a first storage region, defined in the storage domain; and a second storage region, defined in the storage domain and associated with the first storage region, for virtually holding a data image of the first storage region pertaining to a certain time, wherein the storage control part has first copying means for, when after said certain time it has received from the computer a command to write data to a target region in the first storage region, copying data in the target region to the second storage region before said write command is executed, and the storage control part, when it has received from the computer a read request pertaining to the second storage region, if the region for which said read request is received is a region to which copying of data has been carried out by the first copying means, reads out and outputs the data copied by the first copying means, and if the region for which this read request is received is a region to which copying of data has not been carried out by the first copying means, reads out data from the first storage region corresponding to this region, and wherein the storage control part comprises:

determining means for determining whether or not writing from the computer to a target region in the first storage region is sequential writing; and second copying means for, when the determination of the determining means is that it is a sequential writing, copying data of a region continuing from the target region to the second storage region in advance of a write request from the computer arriving in response to receiving said write command.

13. A storage system according to claim 2, further comprising, for when after the designated time it has received a restore request from the computer requesting the restoring to the first volume of the snapshot of the first volume pertaining to the designated time:

second synchronous copying means for, after the restore request is received from the computer, receiving a data access request from the computer with a storage region in the first volume as a target, and, if it is regarded that data recorded in a storage region in the second volume corresponding to the target storage region in the first volume has not been copied to the target storage region since the designated time, copying data recorded in the storage region in the second volume corresponding with the target storage region to the target storage region in response to said second synchronous copying means receiving said data access request from the computer; and second advance copying means for, after the restore request is received from the computer, predicting a storage region in the first volume to be the target of a data access request from the computer in the future, and, if it is regarded that data recorded in a storage region in the second volume corresponding to the predicted storage region has not been copied to the predicted storage region since the designated time, copying data recorded in the storage region in the second volume corresponding with the predicted storage region to the predicted storage region in response to said second synchronous copying means receiving said data access request from the computer.

14. A storage system according to claim 2, further comprising, for when after the designated time it has received a restore request from the computer requesting the restoring to the first volume of the snapshot of the first volume pertaining to the designated time:

second synchronous copying means for, after the restore request is received from the computer, receiving a data access request from the computer with a storage region in the second volume as a target, and, if it is regarded that data recorded in the target storage region in the second volume has not been copied to the first volume since the designated time, copying data recorded in the target storage region to the first volume in response to said second synchronous copying means receiving said data access request from the computer; and second advance copying means for, after the restore request is received from the computer, predicting a storage region in the second volume to be the target of a data access request from the computer in the future, and, if it is regarded that data recorded in the predicted storage region has not been copied to the first volume since the designated time, copying data recorded in the predicted storage region to the first volume in response to said second synchronous copying means receiving said data access request from the computer.

15. A storage system according to claim 2, further comprising second advance copying means for, when after the designated time an advance copying request for snapshot acquisition is received from the computer, performing the same copying operation as the second advance copying means for the whole range or a specified range of the first volume.

16. A storage system according to claim 12, further comprising means for copying data from a remaining region of the first storage region continuing from the target region to the second storage region in advance of the write request from the computer arriving, when the determination of the determining means is that it is a sequential writing in response to receiving said write command.

17. A method for a sequential access in a storage system having a storage domain on which are performed writing and reading of data in response to commands from a computer, comprising:

controlling, by a storage control part, the writing and reading of data in response to commands from a computer;

virtually holding in a second storage region a data image of a first storage region pertaining to a certain time, the first storage region and the second storage region being associated and being defined in the storage domain;

copying, by a first copying means of the storage control part, data in a target region to the second storage region before a write command received from the computer is executed, in response to receiving from the computer, by the first copying means after said certain time, the command to write data to the target region in the first storage region;

reading out and outputting, by the storage control part, the data copied by the first copying means, when the storage control part has received from the computer a read request pertaining to the second storage region, if the region for which this read request is received is a region to which copying of data has been carried out by the first copying means;

reading out data from the first storage region corresponding to this region, by the storage control part, if the region for which said read request is received from the computer is a region to which copying of data has not been carried out by the first copying means;

determining, by a determining means of the storage control part, whether or not writing from the computer to a target region in the first storage region is a sequential writing; and copying by a second copying means of the storage control part, data of a region continuing from the target region to the second storage region in advance of a write request from the computer arriving, when the determination of the determining means is that it is a sequential writing in response to receiving said write command from the computer.

18. The method according to claim 17, further comprising copying data from a remaining region of the first storage region continuing from the target region to the second storage region in advance of the write command from the computer arriving, when the determination of the determining means is that it is a sequential writing in response to receiving said write command from the computer.

19. A storage system according to claim 3, wherein said second synchronous copying means copies said data recorded in the storage region of the second volume corresponding with the target storage region to the target storage region in response to said second synchronous copying means receiving said data access request from the computer, before a data access requested in said data access request received from the computer by said second synchronous copying means is performed.

20. A storage system according to claim 4, wherein said second synchronous copying means copies said data recorded in the target storage region to the first volume in response to said second synchronous copying means receiving said data access request from the computer, before a data access requested in said data access request received from the computer by said second synchronous copying means is performed.

21. A method according to claim 10, wherein said data recorded in the storage region of the second volume corresponding with the target storage region is copied to the target storage region in response to receiving said data access request from the computer in said second synchronous copying step, before a data access requested in said data access request received from the computer in said second synchronous copying step is performed.

22. A method according to claim 11, wherein said data recorded in the target storage region is copied to the first volume in response to receiving said data access request from the computer in said second synchronous copying step, before a data access requested in said data access request received from the computer in said second synchronous copying step is performed.

23. A storage system according to claim 14, wherein said second synchronous copying means copies said data recorded in the storage region in the second volume corresponding with the target storage region to the target storage region in response to said second synchronous copying means receiving said data access request from the computer, before a data access requested in said data access request received from the computer by said second synchronous copying means is performed.

24. A storage system according to claim 15, wherein said second synchronous copying means copies data recorded in the target storage region to the first volume in response to said second synchronous copying means receiving said data access request from the computer, before a data access requested in said data access request received from the computer by said second synchronous copying means is performed.

* * * * *